United States Patent
Tabata et al.

(10) Patent No.: US 10,155,509 B2
(45) Date of Patent: Dec. 18, 2018

(54) DRIVING APPARATUS FOR HYBRID VEHICLE

(75) Inventors: Atsushi Tabata, Okazaki (JP); Tooru Matsubara, Toyota (JP); Kenta Kumazaki, Toyota (JP); Yasuhiro Hiasa, Toyota (JP); Tatsuya Imamura, Okazaki (JP); Takeshi Kitahata, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 704 days.

(21) Appl. No.: 14/425,567

(22) PCT Filed: Sep. 5, 2012

(86) PCT No.: PCT/JP2012/072648
§ 371 (c)(1),
(2), (4) Date: Mar. 3, 2015

(87) PCT Pub. No.: WO2014/038021
PCT Pub. Date: Mar. 13, 2014

(65) Prior Publication Data
US 2015/0224980 A1    Aug. 13, 2015

(51) Int. Cl.
*B60W 20/10* (2016.01)
*B60K 6/445* (2007.10)
(Continued)

(52) U.S. Cl.
CPC .............. *B60W 20/10* (2013.01); *B60K 6/365* (2013.01); *B60K 6/387* (2013.01); *B60K 6/445* (2013.01);
(Continued)

(58) Field of Classification Search
CPC ........ B60K 6/365; B60K 6/387; B60K 6/445; B60K 6/547; B60K 2006/381;
(Continued)

(56) References Cited

U.S. PATENT DOCUMENTS

2007/0265126 A1* 11/2007 Janson ................... B60K 6/387
475/5
2012/0065015 A1   3/2012 Tamai et al.
2013/0090202 A1   4/2013 Hiraiwa

FOREIGN PATENT DOCUMENTS

EP     1 538 014 A2    6/2005
JP     7-336810       12/1995
(Continued)

OTHER PUBLICATIONS

International Search Report dated Oct. 16, 2012 in PCT/JP2012/072648 Filed Sep. 5, 2012.

*Primary Examiner* — Derek D Knight
(74) *Attorney, Agent, or Firm* — Oblon, McClelland, Maier & Neustadt, L.L.P.

(57) ABSTRACT

An engine, a transmission unit which is connected to the engine and is shifted by an engagement apparatus, and a differential unit which connects the transmission unit and a drive wheel are included. The differential unit includes a first rotary element connected to an output element of the transmission unit, a second rotary element connected to a first rotary machine, and a third rotary element connected to the drive wheel. When an output from the first rotary machine is limited, the engagement apparatus is slipped and an operation point of the engine is changed. The change of the operation point can cause an increase in torque of the engine.

14 Claims, 14 Drawing Sheets

(51) Int. Cl.
  *B60W 10/06*   (2006.01)
  *B60W 20/00*   (2016.01)
  *B60W 10/02*   (2006.01)
  *B60W 10/105*  (2012.01)
  *B60W 10/111*  (2012.01)
  *B60W 20/30*   (2016.01)
  *B60K 6/547*   (2007.10)
  *B60W 10/08*   (2006.01)
  *B60W 10/12*   (2012.01)
  *B60K 6/387*   (2007.10)
  *B60W 30/184*  (2012.01)
  *B60W 30/188*  (2012.01)
  *B60K 6/365*   (2007.10)
  *B60K 6/38*    (2007.10)

(52) U.S. Cl.
  CPC ............ *B60K 6/547* (2013.01); *B60W 10/02* (2013.01); *B60W 10/06* (2013.01); *B60W 10/08* (2013.01); *B60W 10/105* (2013.01); *B60W 10/111* (2013.01); *B60W 10/12* (2013.01); *B60W 20/00* (2013.01); *B60W 20/30* (2013.01); *B60W 30/1843* (2013.01); *B60W 30/1882* (2013.01); *B60K 2006/381* (2013.01); *B60W 2510/0241* (2013.01); *B60W 2510/0657* (2013.01); *B60W 2510/083* (2013.01); *B60W 2510/085* (2013.01); *B60W 2510/087* (2013.01); *B60W 2510/246* (2013.01); *B60W 2710/0666* (2013.01); *B60W 2720/40* (2013.01); *Y02T 10/6239* (2013.01); *Y02T 10/6286* (2013.01); *Y02T 10/7258* (2013.01); *Y10S 903/93* (2013.01); *Y10T 477/26* (2015.01)

(58) Field of Classification Search
  CPC ...... B60W 10/02; B60W 10/06; B60W 10/08; B60W 10/105; B60W 10/111; B60W 10/12; B60W 20/00; B60W 20/10; B60W 20/30; B60W 30/1843; B60W 30/1882; B60W 2510/0241; B60W 2510/0657; B60W 2510/083; B60W 2510/085; B60W 2510/087; B60W 2510/246; B60W 2710/0666; B60W 2720/40; Y02T 10/6239; Y02T 10/6286; Y02T 10/7258; Y10S 903/93; Y10T 477/26
  See application file for complete search history.

(56) References Cited

FOREIGN PATENT DOCUMENTS

| | | |
|---|---|---|
| JP | 2000-346187 A | 12/2000 |
| JP | 2006 298066 | 11/2006 |
| JP | 2009 190694 | 8/2009 |

* cited by examiner

| | | | | CL1 | BK1 | MG1 | MG2 |
|---|---|---|---|---|---|---|---|
| EV | FORWARD MOVEMENT/ BACKWARD MOVEMENT | SINGLE-DRIVE | DRIVE | | | G | M |
| | | | USE ENGINE BRAKE TOGETHER | △ | △ | G | M |
| | | BOTH-DRIVE | | O | O | M | M |
| HV | FORWARD MOVEMENT | HIGH | | | O | G | M |
| | | LOW | | O | | G | M |
| | BACKWARD MOVEMENT | LOW | | O | | G | M |

O: ENGAGEMENT   △: EITHER ONE IS ENGAGED WHEN ENGINE BRAKE IS USED TOGETHER
G: MAINLY GENERATOR   M: MAINLY MOTOR, BUT GENERATOR DURING REGENERATION

DRIVING APPARATUS FOR HYBRID VEHICLE

FIELD

The present invention relates to a driving apparatus for a hybrid vehicle.

BACKGROUND

Conventionally, a driving apparatus including a transmission unit has been widely known. For example, in Patent Literature 1, a technique of a driving apparatus of a hybrid vehicle which apparatus includes a transmission mechanism to shift a rotation of an internal-combustion engine and to transmit the rotation to a power distribution mechanism, a first transmission shaft to transmit power from the internal-combustion engine to the transmission mechanism, and a second transmission shaft to transmit the power output from the transmission mechanism to the power distribution mechanism has been disclosed.

CITATION LIST

Patent Literature

Patent Literature 1: Japanese Laid-open Patent Publication No. 2009-190694

SUMMARY

Technical Problem

Here, there is still a room for improvement with respect to suppression of a decrease in drivability of when an output from a rotary machine is limited in a hybrid vehicle including the rotary machine.

A purpose of the present invention is to provide a driving apparatus for a hybrid vehicle to suppress a decrease in drivability of when an output from a rotary machine is limited.

Solution to Problem

A driving apparatus for a hybrid vehicle according to the present invention includes: an engine; a transmission unit which is connected to the engine and is shifted by an engagement apparatus; and a differential unit which connects the transmission unit and a drive wheel, the differential unit comprising: a first rotary element connected to an output element of the transmission unit; a second rotary element connected to a first rotary machine; and a third rotary element connected to the drive wheel, and the engagement apparatus is slipped and an operation point of the engine is changed at a time an output from the first rotary machine is limited.

In the above-described driving apparatus for a hybrid vehicle, the change of the operation point causes an increase in torque of the engine.

In the above-described driving apparatus for a hybrid vehicle, the change of the operation point brings a transmission gear ratio of the transmission unit to an underdrive side compared to the transmission gear ratio before the engagement apparatus is slipped.

The above-described driving apparatus for a hybrid vehicle further includes a second rotary machine connected to the drive wheel and the third rotary element, and the engagement apparatus is slipped and an operation point of the engine is changed in at least one of: a case where an output from the first rotary machine is limited; and a case where an output from the second rotary machine is limited.

In the above-described driving apparatus for a hybrid vehicle, the larger a decrease in the output from the rotary machine becomes, the more a differential rotation speed of the engagement apparatus is increased.

In the above-described driving apparatus for a hybrid vehicle, a torque capacity of the engagement apparatus is previously decreased before the output from the rotary machine is decreased.

In the above-described driving apparatus for a hybrid vehicle, current limiting control to limit a supply current to the second rotary machine during a low rotation of the second rotary machine is performed, a degree of variation in torque of the second rotary machine in a case of returning from the current limiting control varies depending on whether the engagement apparatus is slipped, and a degree of variation in the torque of the second rotary machine of when the engagement apparatus is slipped is smaller than a degree of variation in the torque of the second rotary machine of when the engagement apparatus is completely engaged.

Advantageous Effects of Invention

When an output from a first rotary machine is limited, a driving apparatus for a hybrid vehicle according to the present invention slips an engagement apparatus and changes an operation point of an engine. According to the driving apparatus for a hybrid vehicle of the present invention, it is possible to suppress a decrease in drivability of when an output from a rotary machine is limited.

DESCRIPTION OF EMBODIMENTS

In the following, a driving apparatus for a hybrid vehicle according to an embodiment of the present invention will be described in detail with reference to the drawings. Note that the present invention is not limited to the embodiment. Also, a component in the following embodiment includes what can be easily assumed by those skilled in the art or what is substantially the same.

Embodiment

Figure 1:
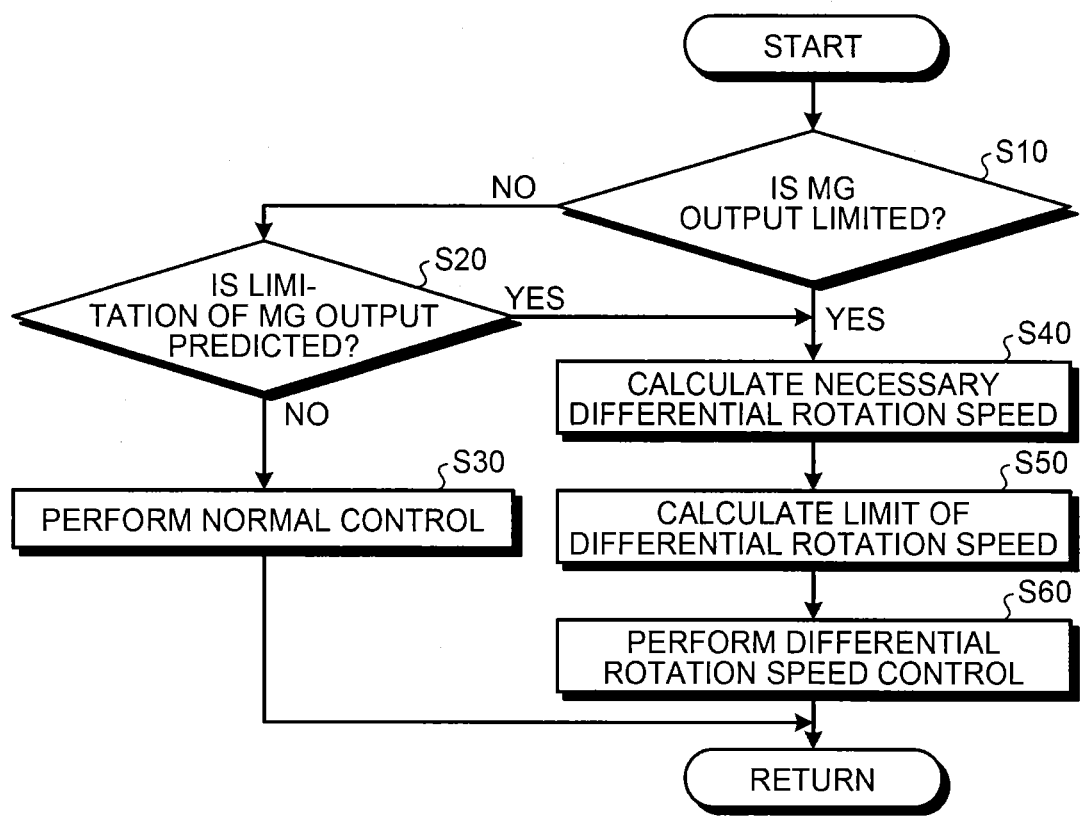
FIG. 1 is a flowchart illustrating an operation of a driving apparatus for a hybrid vehicle according to an embodiment.
Figure 5:
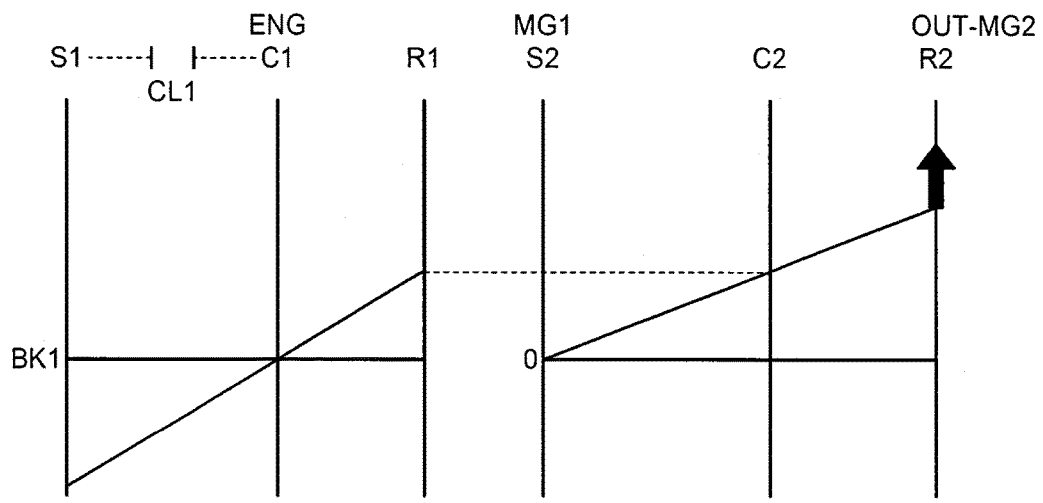
FIG. 5 is a collinear diagram of a single motor EV mode.
Figure 6:
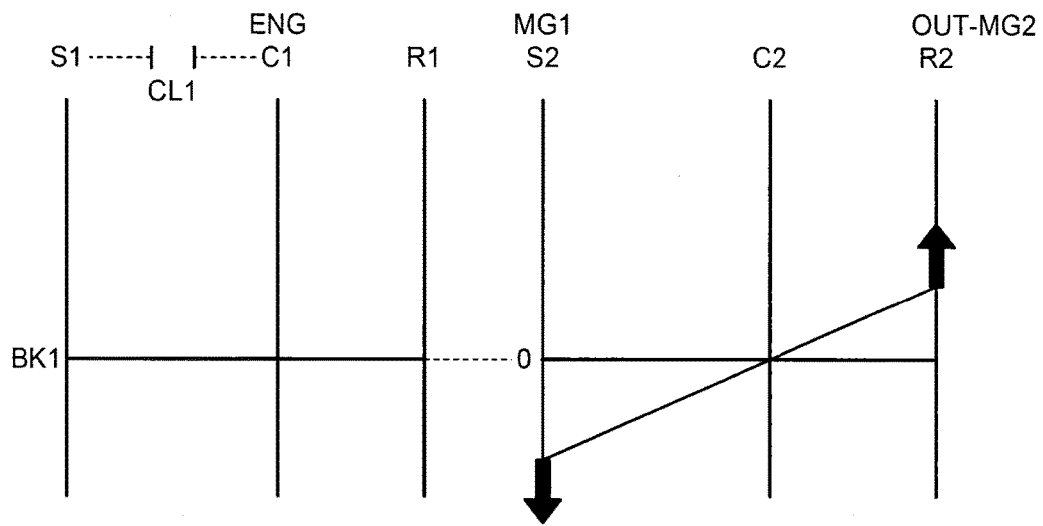
FIG. 6 is a collinear diagram of a both motor EV mode.
Figure 7:
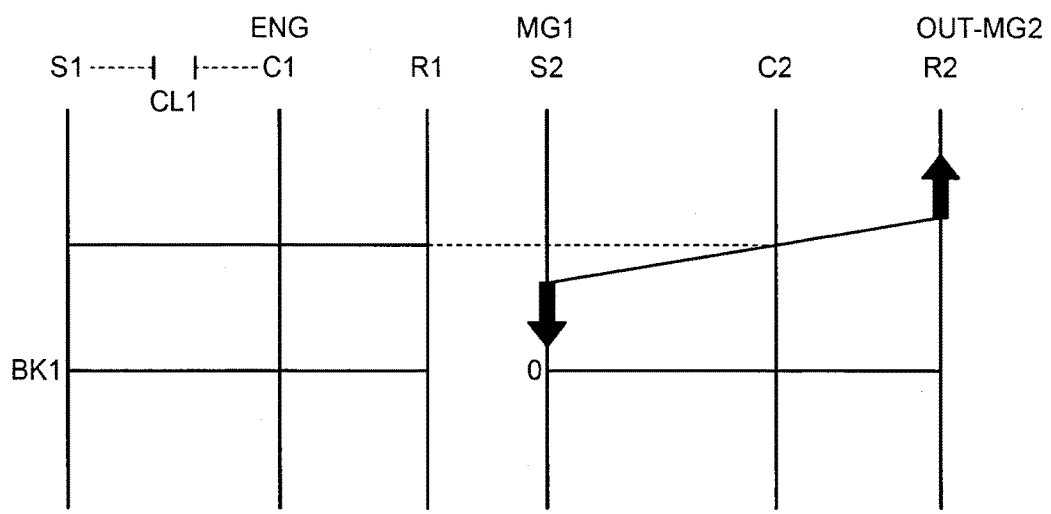
FIG. 7 is a collinear diagram of an HV low mode.
Figure 8:
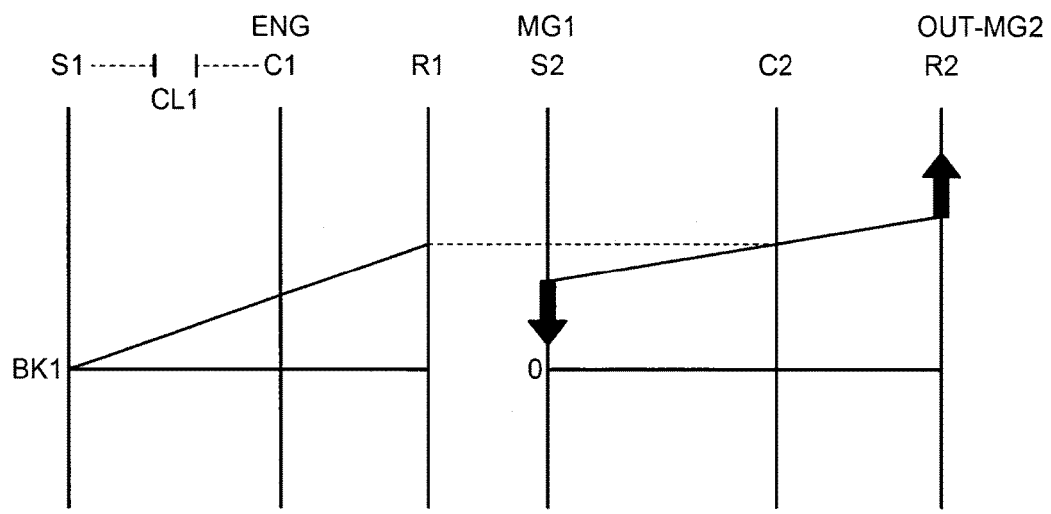
FIG. 8 is a collinear diagram of a HV high mode.
Figure 9:
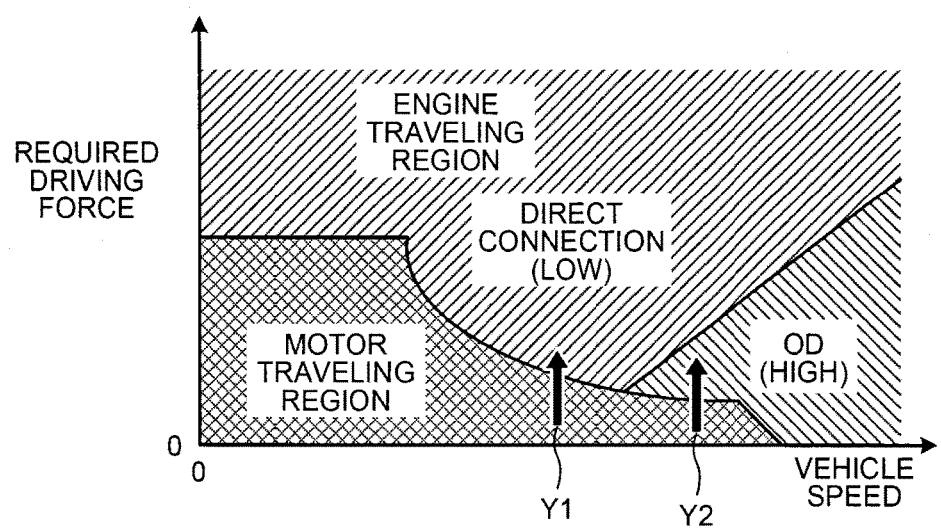
FIG. 9 is a view illustrating a map related to mode selection in the embodiment.
Figure 10:
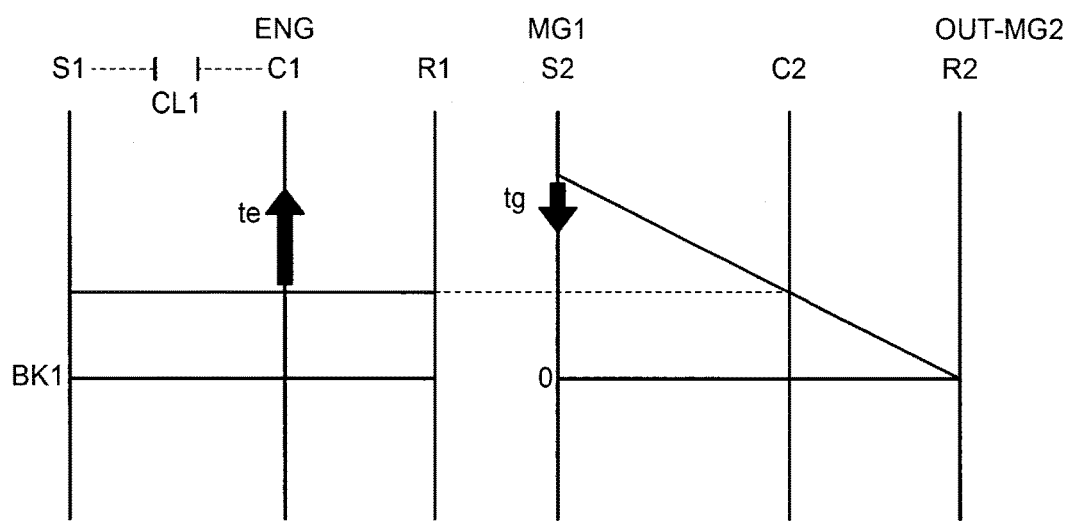
FIG. 10 is a collinear diagram of when an output from a rotary machine is decreased.
Figure 11:
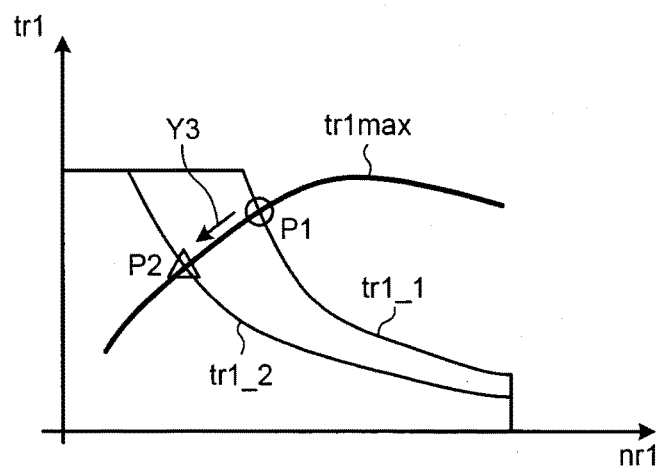
FIG. 11 is a view for describing a decrease in an engine output.
Figure 12:
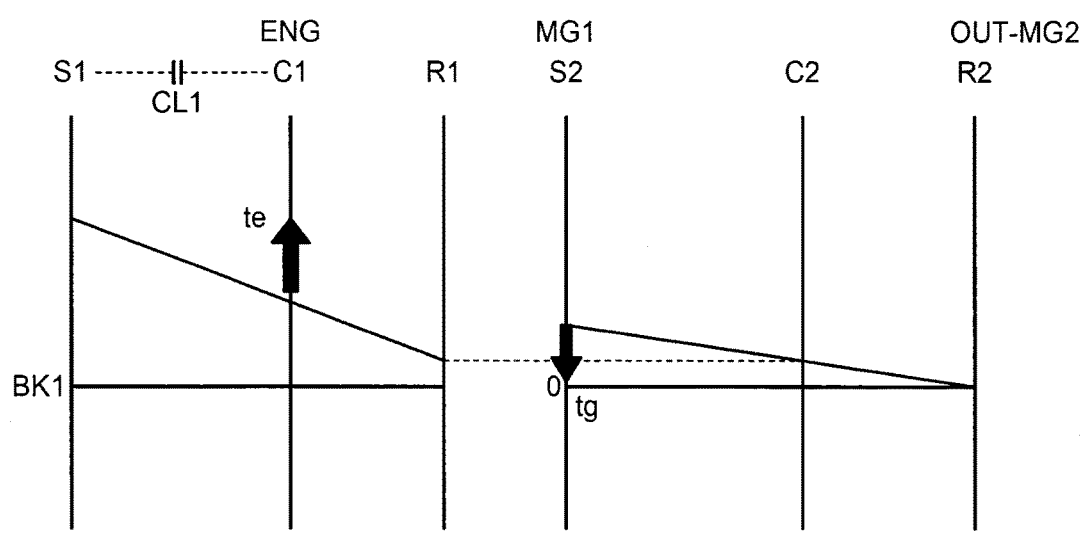
FIG. 12 is a collinear diagram of operation point changing control in the embodiment.
Figure 13:
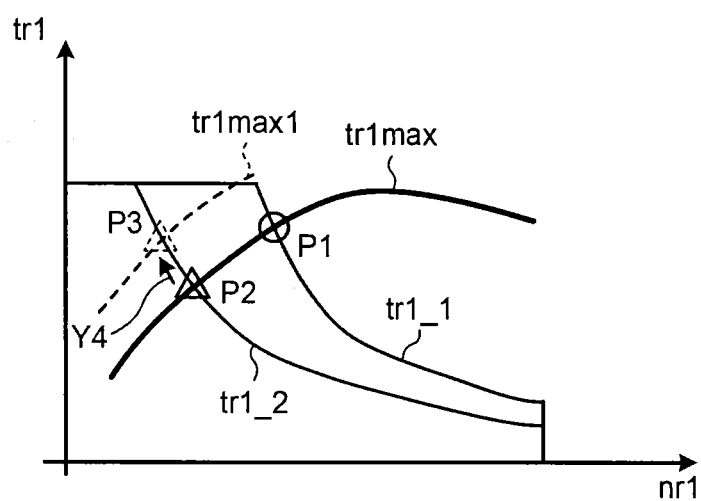
FIG. 13 is view for describing a change in an engine operation point in the embodiment.
Figure 14:
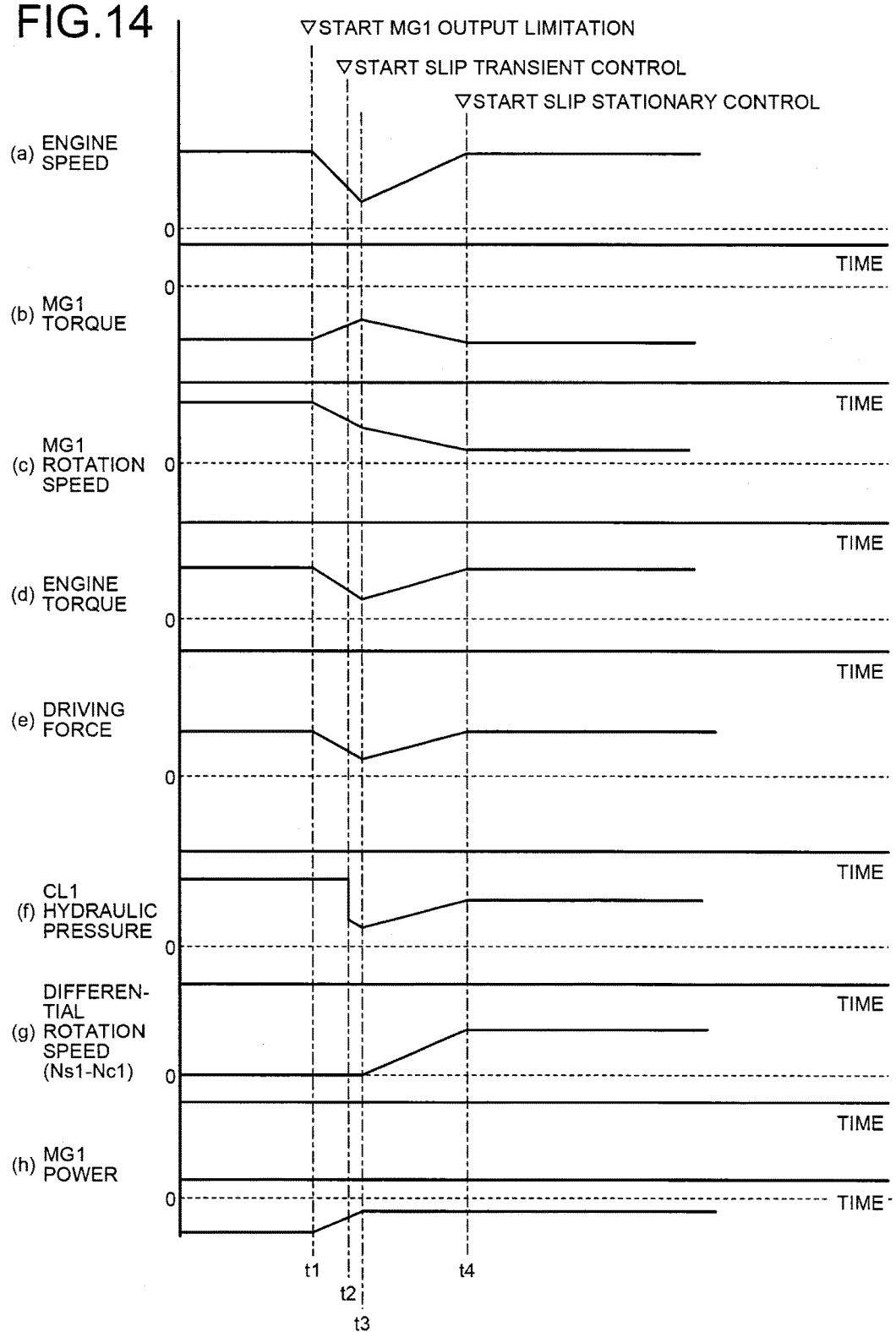
FIG. 14 is a time chart illustrating an operation in the embodiment.
Figure 15:
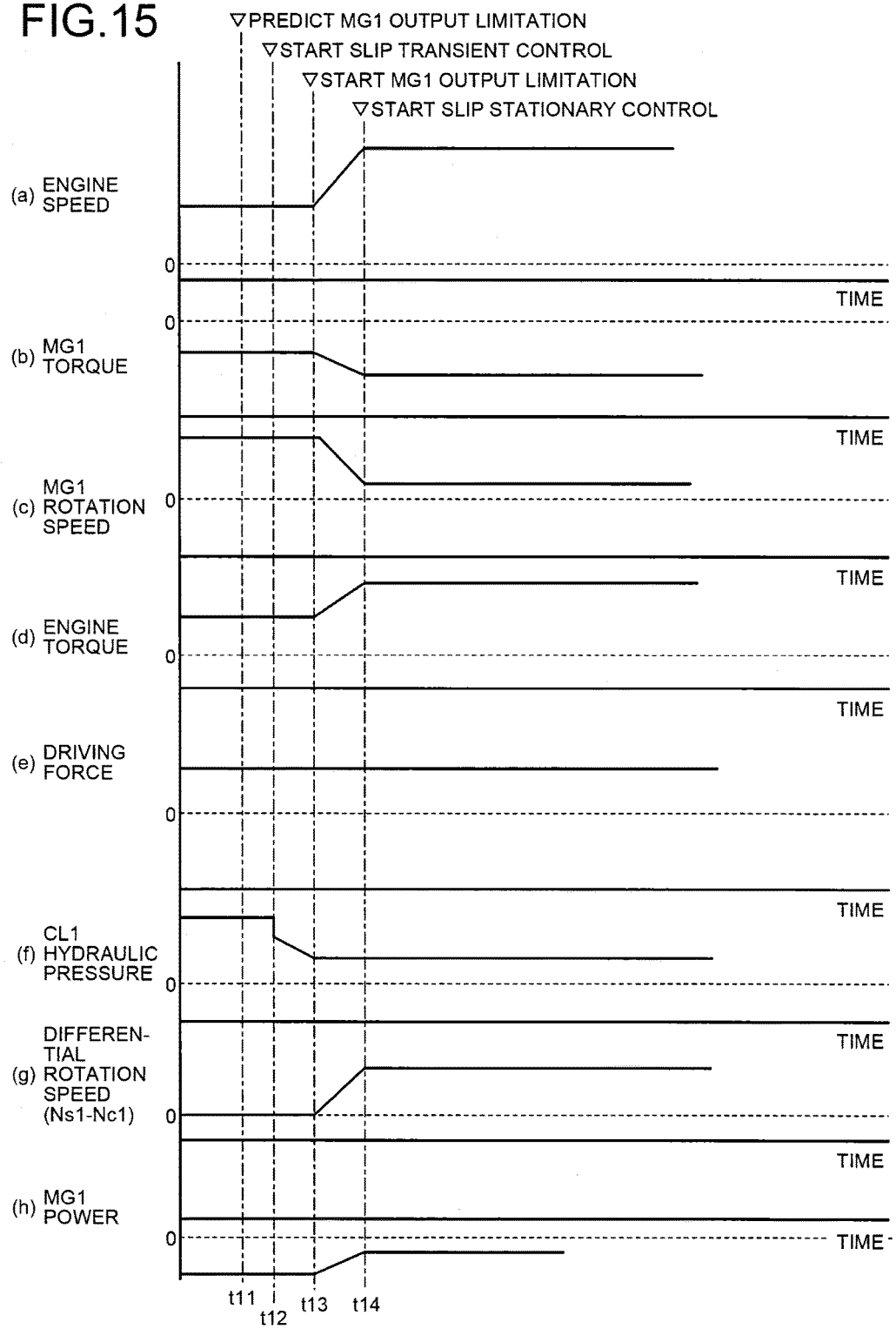
FIG. 15 is a different time chart illustrating an operation in the embodiment.

With reference to FIG. 1 to FIG. 21, the embodiment will be described. The present embodiment relates to a driving apparatus for a hybrid vehicle. FIG. 1 is a flowchart illustrating an operation of a driving apparatus for a hybrid vehicle according to the embodiment of the present invention, FIG. 2 is a skeleton view of a vehicle according to the embodiment, FIG. 3 is an input/output relationship view of the vehicle according to the embodiment, FIG. 4 is an actuation engagement chart of the driving apparatus for a hybrid vehicle according to the embodiment, FIG. 5 is a collinear diagram of a single motor EV mode, FIG. 6 is a collinear diagram of a both motor EV mode, FIG. 7 is a collinear diagram of an HV low mode, FIG. 8 is a collinear diagram of an HV high mode, FIG. 9 is a view illustrating a map of mode selection in the embodiment, FIG. 10 is a collinear diagram of when an output from the rotary machine is decreased, FIG. 11 is a view for describing a decrease in an engine output, FIG. 12 is a collinear diagram of operation point changing control of the embodiment, FIG. 13 is a view for describing a change in an engine operation point of the embodiment, FIG. 14 is a time chart illustrating an operation in the embodiment, and FIG. 15 is a different time chart illustrating an operation in the embodiment.

Figure 2:
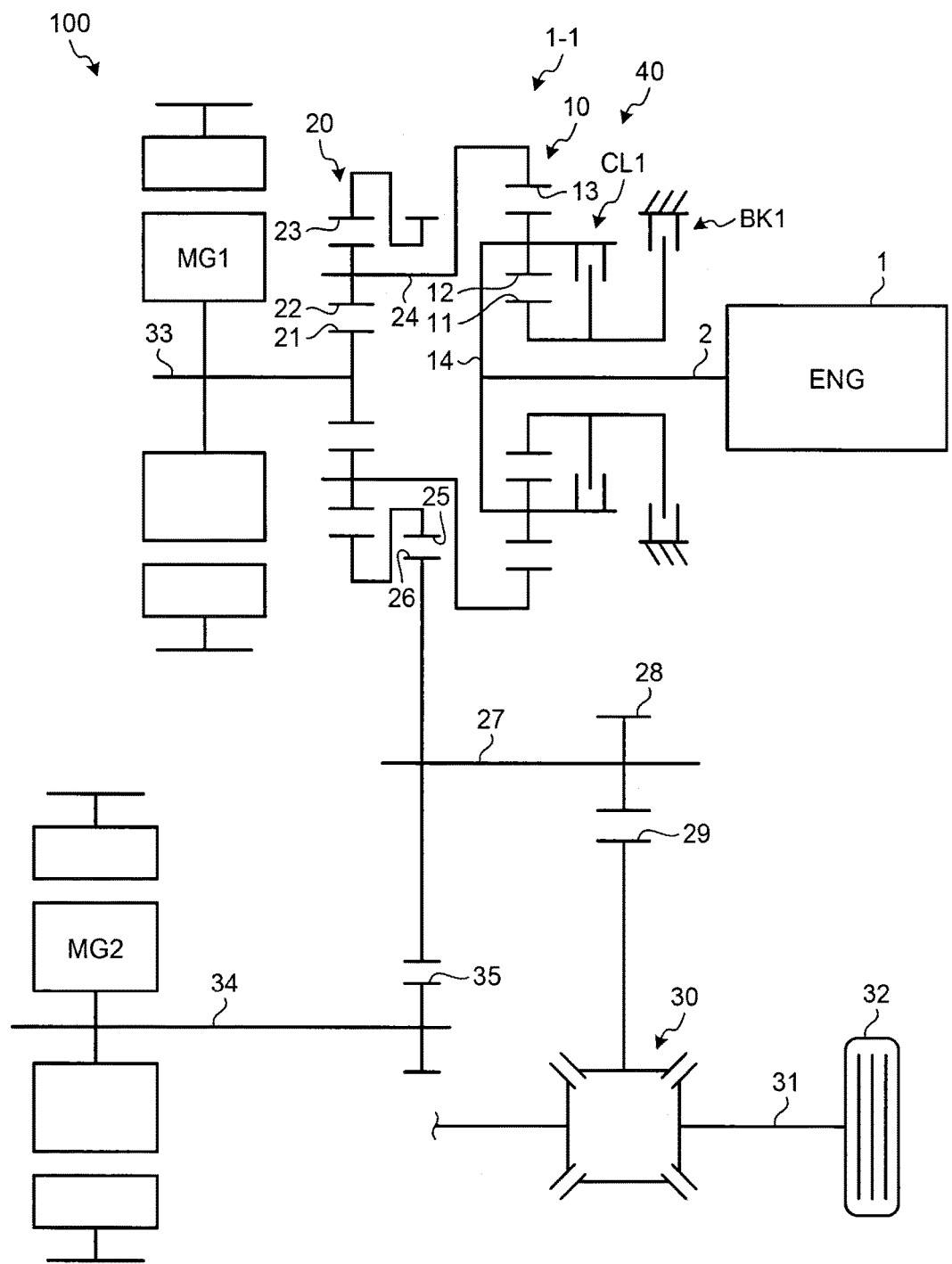
FIG. 2 is a skeleton view of a vehicle according to the embodiment.
Figures 3, 4:
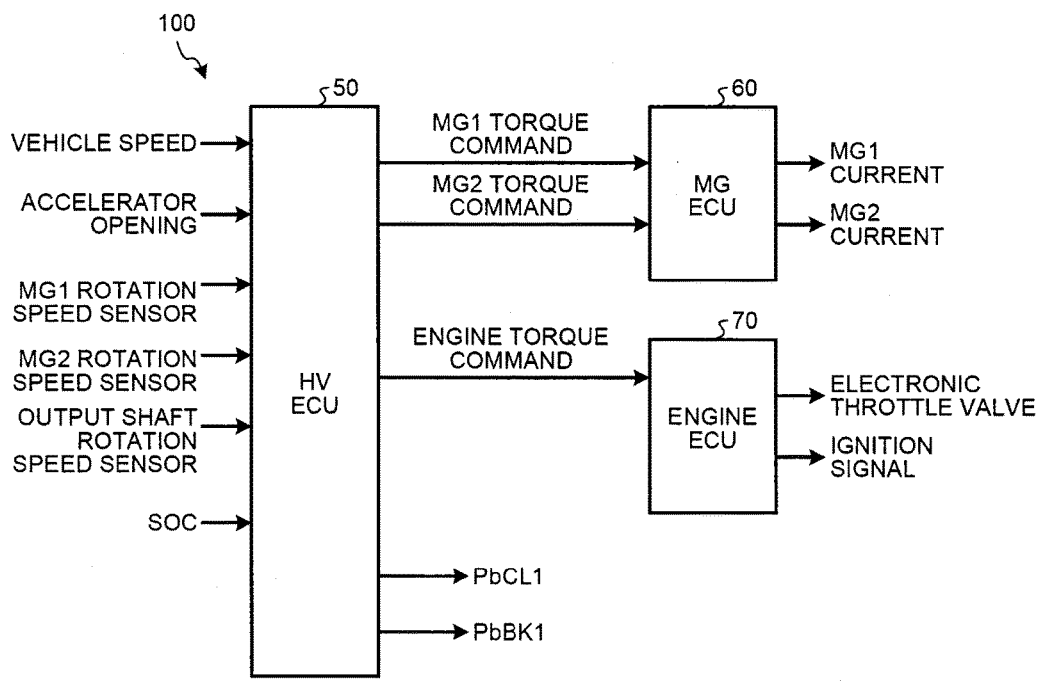
FIG. 3 is an input/output relationship view of the vehicle according to the embodiment.
FIG. 4 is an actuation engagement chart of the driving apparatus for a hybrid vehicle according to the embodiment.

As illustrated in FIG. 2, a vehicle 100 according to the present embodiment is a hybrid (HV) vehicle including an engine 1, a first rotary machine MG1, and a second rotary machine MG2 as power sources. The vehicle 100 may be a plug-in hybrid (PHV) vehicle which can be charged by an external power supply. As illustrated in FIG. 2 and FIG. 3, the vehicle 100 includes the engine 1, a first planetary gear mechanism 10, a second planetary gear mechanism 20, the first rotary machine MG1, the second rotary machine MG2, a clutch CL1, a brake BK1, an HV_ECU 50, an MG_ECU 60, and an engine_ECU 70.

Also, a driving apparatus for a hybrid vehicle 1-1 according to the embodiment includes the engine 1, the first planetary gear mechanism 10, the second planetary gear mechanism 20, the clutch CL1, and the brake BK1. The driving apparatus for a hybrid vehicle 1-1 may further include a control apparatus of each of the ECUs 50, 60, and 70 or the like. Also, the driving apparatus for a hybrid vehicle 1-1 may include the first rotary machine MG1 and the second rotary machine MG2. The driving apparatus for a hybrid vehicle 1-1 can be applied, for example, to a front engine front wheel drive (FF) vehicle or a rear engine rear wheel drive (RR) vehicle. The driving apparatus for a hybrid vehicle 1-1 is mounted to the vehicle 100, for example, in such a manner that an axial direction becomes a vehicle width direction.

In the driving apparatus for a hybrid vehicle 1-1 according to the present embodiment, a transmission part (transmission mechanism) 40 includes the first planetary gear mechanism 10, the clutch CL1, and the brake BK1. Also, a differential unit includes the second planetary gear mechanism 20. The clutch CL1 and the brake BK1 are engagement apparatuses to shift the first planetary gear mechanism 10.

The engine 1 which is an engine converts combustion energy of fuel into rotational movement of an output shaft and outputs the rotational movement. The output shaft of the engine 1 is connected to an input shaft 2. The input shaft 2 is an input shaft of a power transmission apparatus. The power transmission apparatus includes the first rotary machine MG1, the second rotary machine MG2, the clutch CL1, the brake BK1, a differential apparatus 30, and the like. The input shaft 2 is arranged on an extended line of the output shaft of the engine 1 in a coaxial manner. The input shaft 2 is connected to a first carrier 14 of the first planetary gear mechanism 10.

The transmission unit 40 including the first planetary gear mechanism 10 is connected to the engine 1 and is shifted by the engagement apparatus (clutch CL1 and brake BK1). The transmission unit 40 can shift and output a rotation of the engine 1. The first planetary gear mechanism 10 is an input-side differential mechanism arranged closer to a side of the engine 1 than the second planetary gear mechanism 20. The first planetary gear mechanism 10 is a single pinion type and includes a first sun gear 11, a first pinion gear 12, a first ring gear 13, and a first carrier 14.

The first ring gear 13 is arranged outside in a radial direction of the first sun gear 11 in a coaxial manner. The first pinion gear 12 is arranged between the first sun gear 11 and the first ring gear 13. The first sun gear 11 and the first ring gear 13 engage with each other. The first pinion gear 12 is rotatably supported by the first carrier 14. The first carrier 14 is coupled to the input shaft 2 and rotates integrally with the input shaft 2. Thus, the first pinion gear 12 can rotate (revolve) with the input shaft 2 around a center axis of the input shaft 2. Also, the first pinion gear 12 is supported by the first carrier 14 and can rotate around a center axis of the first pinion gear 12.

The clutch CL1 is a clutch apparatus which can couple the first sun gear 11 and the first carrier 14. The clutch CL1 of the present embodiment is a friction engagement type clutch. The clutch CL1 is engaged or released, for example, due to control by a hydraulic pressure. A completely-engaged clutch CL1 can couple the first sun gear 11 and the first carrier 14 and can integrally rotate the first sun gear 11 and the first carrier 14. The completely-engaged clutch CL1 regulates a differential movement of the first planetary gear mechanism 10. On the other hand, a released clutch CL1 can separate the first sun gear 11 and the first carrier 14 and allows a relative rotation of the first sun gear 11 and the first carrier 14. That is, the released clutch CL1 allows a differential movement of the first planetary gear mechanism 10. Note that it is possible to control the clutch CL1 into a half-engaged state. The half-engaged clutch CL1 allows a differential movement of the first planetary gear mechanism 10.

The brake BK1 is a brake apparatus which can regulate a rotation of the first sun gear 11. The brake BK1 includes an engagement element connected to the first sun gear 11 and an engagement element connected to a side of a vehicle body such as a chassis of the power transmission apparatus. The brake BK1 is a friction engagement type clutch apparatus similar to the clutch CL1. The brake BK1 is engaged or released, for example, due to control by a hydraulic pressure. A completely engaged brake BK1 can couple the first sun gear 11 and the side of the vehicle body and can regulate a rotation of the first sun gear 11. On the other hand, a released brake BK1 separates the first sun gear 11 and the side of the vehicle body and allows a rotation of the first sun gear 11. Note that it is possible to control the brake BK1 into a half-engaged state. The half-engaged brake BK1 allows a rotation of the first sun gear 11.

The second planetary gear mechanism 20 of the present embodiment is mounted to the vehicle 100 as a differential unit to connect the transmission unit 40, which includes the first planetary gear mechanism 10, and a drive wheel 32. The second planetary gear mechanism 20 is an output-side differential mechanism arranged closer to a side of the drive wheel 32 than the first planetary gear mechanism 10. The second planetary gear mechanism 20 is a single pinion type and includes a second sun gear 21, a second pinion gear 22, a second ring gear 23, and a second carrier 24. The second planetary gear mechanism 20 is arranged coaxially with the first planetary gear mechanism 10 and faces the engine 1 with the first planetary gear mechanism 10 therebetween.

The second ring gear 23 is arranged outside in a radial direction of the second sun gear 21 in a coaxial manner. The second pinion gear 22 is arranged between the second sun gear 21 and the second ring gear 23. The second sun gear 21 and the second ring gear 23 engage with each other. The second pinion gear 22 is rotatably supported by the second carrier 24. The second carrier 24 is connected to the first ring gear 13 and rotates integrally with the first ring gear 13. The second pinion gear 22 can rotate (revolve) with the second carrier 24 around a center axis of the input shaft 2. Also, the second pinion gear 22 is supported by the second carrier 24 and can rotate around a center axis of the second pinion gear 22. The first ring gear 13 is an output element of the first planetary gear mechanism 10 and can output a rotation, which is input from the engine 1 into the first planetary gear mechanism 10, to the second carrier 24. The second carrier 24 corresponds to a first rotary element connected to the output element of the first planetary gear mechanism 10.

To the second sun gear 21, a rotary shaft 33 of the first rotary machine MG1 is connected. The rotary shaft 33 of the first rotary machine MG1 is arranged coaxially with the input shaft 2 and rotates integrally with the second sun gear 21. The second sun gear 21 corresponds to a second rotary element connected to the first rotary machine MG1. To the second ring gear 23, a counter drive gear 25 is connected. The counter drive gear 25 is an output gear which rotates integrally with the second ring gear 23. The second ring gear 23 corresponds to a third rotary element connected to the second rotary machine MG2 and the drive wheel 32. The second ring gear 23 is an output element which can output, to the drive wheel 32, a rotation input from the first rotary machine MG1 or the first planetary gear mechanism 10.

The counter drive gear 25 is engaged with a counter driven gear 26. The counter driven gear 26 is connected to a drive pinion gear 28 through a counter shaft 27. The counter driven gear 26 and the drive pinion gear 28 rotate integrally. Also, a reduction gear 35 is engaged with the counter driven gear 26. The reduction gear 35 is connected to a rotary shaft 34 of the second rotary machine MG2. That is, a rotation of the second rotary machine MG2 is transmitted to the counter driven gear 26 through the reduction gear 35. The reduction gear 35 has a diameter smaller than that of the counter driven gear 26. The reduction gear 35 reduces the rotation of the second rotary machine MG2 and transmits the rotation to the counter driven gear 26.

The drive pinion gear 28 is engaged with a differential ring gear 29 of the differential apparatus 30. The differential apparatus 30 is connected to the drive wheel 32 through right and left drive shafts 31. The second ring gear 23 is connected to the drive wheel 32 through the counter drive gear 25, the counter driven gear 26, the drive pinion gear 28, the differential apparatus 30, and the drive shaft 31. Also, the second rotary machine MG2 is connected to a power transmission path between the second ring gear 23 and the drive wheel 32 and can transmit power to each of the second ring gear 23 and the drive wheel 32.

Each of the first rotary machine MG1 and the second rotary machine MG2 includes a function as a motor (electric motor) and a function as a generator. Each of the first rotary machine MG1 and the second rotary machine MG2 is connected to a battery through an inverter. Each of the first rotary machine MG1 and the second rotary machine MG2 can convert electric power, which is supplied by the battery, into mechanical power and can output the mechanical power. Also, each of the first rotary machine MG1 and the second rotary machine MG2 can convert the mechanical power into electric power when being driven by input power. The electric power generated by the rotary machine MG1/MG2 can be accumulated into the battery. As each of the first rotary machine MG1 and the second rotary machine MG2, for example, a three-phase AC synchronous motor generator can be used.

In the vehicle 100 of the present embodiment, the brake BK1, the clutch CL1, the first planetary gear mechanism 10, the counter drive gear 25, the second planetary gear mechanism 20, and the first rotary machine MG1 are arranged in an order from the engine 1 in a manner coaxial with the engine 1. Also, the driving apparatus for a hybrid vehicle 1-1 of the present embodiment is a multi-shaft type in which the input shaft 2 and the rotary shaft 34 of the second rotary machine MG2 are arranged on different axes.

As illustrated in FIG. 3, the vehicle 100 includes the HV_ECU 50, the MG_ECU 60, and the engine_ECU 70. Each of the ECUs 50, 60, and 70 is an electronic control unit including a computer. The HV_ECU 50 includes a function to integrally control the vehicle 100 as a whole. The MG_ECU 60 and the engine_ECU 70 are electrically connected to the HV_ECU 50.

The MG_ECU 60 can control the first rotary machine MG1 and the second rotary machine MG2. For example, the MG_ECU 60 can control output torque of the first rotary machine MG1 by adjusting a current value supplied to the first rotary machine MG1 (hereinafter, also referred to as "MG1 current"). Also, the MG_ECU 60 can control output torque of the second rotary machine MG2 by adjusting a current value supplied to the second rotary machine MG2 (hereinafter, also referred to as "MG2 current").

The engine_ECU 70 can control the engine 1. For example, the engine_ECU 70 can control an opening of an electronic throttle valve of the engine 1, can perform ignition control of the engine 1 by outputting an ignition signal, and can perform injection control of fuel toward the engine 1.

The engine_ECU 70 can control output torque of the engine 1 by the opening control of the electronic throttle valve, the injection control, the ignition control, or the like.

To the HV_ECU 50, a vehicle speed sensor, an accelerator opening sensor, an MG1 rotation speed sensor, an MG2 rotation speed sensor, an output shaft rotation speed sensor, a battery sensor, and the like are connected. By these sensors, the HV_ECU 50 can acquire a vehicle speed, an accelerator opening, a rotation speed of the first rotary machine MG1 (hereinafter, also referred to as "MG1 rotation speed"), a rotation speed of the second rotary machine MG2 (hereinafter, also referred to as "MG2 rotation speed"), a rotation speed of the output shaft of the power transmission apparatus, a battery state SOC, and the like.

Based on the acquired information, the HV_ECU 50 can calculate required driving force, required power, required torque, and the like with respect to the vehicle 100. Based on the calculated required value, the HV_ECU 50 determines output torque of the first rotary machine MG1 (hereinafter, also referred to as "MG1 torque"), output torque of the second rotary machine MG2 (hereinafter, also referred to as "MG2 torque"), and output torque of the engine 1 (hereinafter, also referred to as "engine torque"). The HV_ECU 50 outputs a command value of the MG1 torque and a command value of the MG2 torque to the MG_ECU 60. Also, the HV_ECU 50 outputs a command value of the engine torque to the engine_ECU 70.

Based on a traveling mode or the like described later, the HV_ECU 50 controls each of the clutch CL1 and the brake BK1. The HV_ECU 50 outputs a command value of a supply hydraulic pressure (PbCL1) to the clutch CL1 and a command value of a supply hydraulic pressure (PbBK1) to the brake BK1. A hydraulic pressure control apparatus (not illustrated) controls supply hydraulic pressure toward the clutch CL1 and the brake BK1 according to the command values of the supply hydraulic pressure PbCL1 and the supply hydraulic pressure PbBK1.

In the vehicle 100, hybrid (HV) traveling and EV traveling can be selectively executed. The HV traveling is a traveling mode to make the vehicle 100 travel with the engine 1 as a power source. In the HV traveling, the second rotary machine MG2 may be further used as the power source in addition to the engine 1.

The EV traveling is a traveling mode to perform traveling with at least one of the first rotary machine MG1 and the second rotary machine MG2 as a power source. In the EV traveling, traveling can be performed while the engine 1 is stopped. The driving apparatus for a hybrid vehicle 1-1 according to the present embodiment includes, as the EV traveling mode, a single motor EV mode (single-drive EV mode) to make the vehicle 100 travel with the second rotary machine MG2 as a single power source and a both motor EV mode (both-drive EV mode) to make the vehicle 100 travel with the first rotary machine MG1 and the second rotary machine MG2 as power sources.

In the engagement chart in FIG. 4, a circle in each of a column of the clutch CL1 and a column of the brake BK1 indicates engagement and an empty column indicates release. Also, a triangular indicates that one of the clutch CL1 and the brake BK1 is engaged and the other is released. The single motor EV mode is executed, for example, by releasing both of the clutch CL1 and the brake BK1. FIG. 5 is a collinear diagram of the single motor EV mode. In the collinear diagram, signs S1, C1, and R1 respectively indicate the first sun gear 11, the first carrier 14, and the first ring gear 13 and signs S2, C2, and R2 respectively indicate the second sun gear 21, the second carrier 24, and the second ring gear 23.

In the single motor EV mode, the clutch CL1 and the brake BK1 are released. Since the brake BK1 is released, a rotation of the first sun gear 11 is allowed. Also, since the clutch CL1 is released, the first planetary gear mechanism 10 can perform a differential movement. The HV_ECU 50 makes the second rotary machine MG2 output positive torque through the MG_ECU 60 and generates, in the vehicle 100, driving force in a forward direction. The second ring gear 23 performs a positive rotation in conjunction with a rotation of the drive wheel 32. Here, the positive rotation is in a direction of the rotation of the second ring gear 23 during forward movement of the vehicle 100. The HV_ECU 50 actuates the first rotary machine MG1 as a generator and reduces a dragging loss. More specifically, the HV_ECU 50 generates power by slightly applying torque to the first rotary machine MG1 and makes the rotation speed of the first rotary machine MG1 zero. Accordingly, the dragging loss of the first rotary machine MG1 can be reduced. Also, in a case where it is possible to keep the MG1 rotation speed zero by using a cogging torque even when the MG1 torque is zero, the MG1 torque may not be applied. Alternatively, the MG1 rotation speed may become zero by a d-axis lock of the first rotary machine MG1.

The first ring gear 13 performs a positive rotation along with the second carrier 24. In the first planetary gear mechanism 10, since the clutch CL1 and the brake BK1 are released and in a neutral state, the engine 1 is not moved together and the first carrier 14 stops the rotation. Accordingly, a regeneration amount can be large. The first sun gear 11 runs idle and performs a negative rotation.

There may be a case where the battery is charged fully during the traveling in the single motor EV mode and it is not possible to acquire regeneration energy. In this case, it is considered to use an engine brake together. By the engagement of the clutch CL1 or the brake BK1, it is possible to connect the engine 1 to the drive wheel 32 and to make the engine brake work on the drive wheel 32. As indicated by the triangular in FIG. 4, when the clutch CL1 or the brake BK1 is engaged in the single motor EV mode, it is possible to move the engine 1 together and to bring a state into an engine brake state by increasing the engine speed by the first rotary machine MG1.

In the both motor EV mode, the HV_ECU 50 performs engagement of the clutch CL1 and the brake BK1. FIG. 6 is a collinear diagram of the both motor EV mode. When the clutch CL1 is engaged, a differential movement of the first planetary gear mechanism 10 is regulated. Also, when the brake BK1 is engaged, a rotation of the first sun gear 11 is regulated. Thus, rotations of all rotary elements of the first planetary gear mechanism 10 are stopped. Since a rotation of the first ring gear 13 which is an output element is regulated, a rotation of the second carrier 24 connected thereto is locked to zero.

The HV_ECU 50 makes each of the first rotary machine MG1 and the second rotary machine MG2 output torque for a traveling drive. Since the rotation is regulated, the second carrier 24 acquires reaction force to the torque of the first rotary machine MG1 and can output the torque of the first rotary machine MG1 from the second ring gear 23. The first rotary machine MG1 can output positive torque from the second ring gear 23 by outputting negative torque and performing a negative rotation during a forward movement. On the other hand, during a backward movement, the first rotary machine MG1 can output negative torque from the second ring gear 23 by outputting positive torque and performing a positive rotation.

In the HV traveling, switching of low/high of the first planetary gear mechanism 10 of the transmission unit 40 is performed with a differential state of the second planetary gear mechanism 20, which functions as the differential unit, as a base.

In the HV low mode, the HV_ECU 50 engages the clutch CL1 and releases the brake BK1. By the engagement of the clutch CL1, a differential movement of the first planetary gear mechanism 10 is regulated and the rotary elements 11, 13, and 14 are rotated integrally. Thus, a rotation of the engine 1 is not increased or reduced and is transmitted from the first ring gear 13 to the second carrier 24 at a constant speed.

On the other hand, in the HV high mode, the HV_ECU 50 releases the clutch CL1 and engages the brake BK1. By the engagement of the brake BK1, a rotation of the first sun gear 11 is regulated. Accordingly, the first planetary gear mechanism 10 becomes an overdrive (OD) state in which a rotation of the engine 1 input into the first carrier 14 is increased and is output from the first ring gear 13. In such a manner, the first planetary gear mechanism 10 can increase and output the rotation of the engine 1. A transmission gear ratio of the first planetary gear mechanism 10 during the overdrive can be, for example, 0.7.

In such a manner, a switching apparatus including the clutch CL1 and the brake BK1 shifts the first planetary gear mechanism 10 by switching a state to regulate a differential movement of the first planetary gear mechanism 10 and a state to allow the differential movement of the first planetary gear mechanism 10. The driving apparatus for a hybrid vehicle 1-1 can switch the HV high mode and the HV low mode with the transmission unit 40 including the first planetary gear mechanism 10, the clutch CL1, and the brake BK1 and transmission efficiency of the vehicle 100 can be improved. Also, in the following stage of the transmission unit 40, the second planetary gear mechanism 20 which functions as a differential unit is connected in series. Since the first planetary gear mechanism 10 is an overdrive, there is an advantage that it is not necessary to greatly increase the torque of the first rotary machine MG1.

For example, the HV_ECU 50 selects the HV high mode at a high vehicle speed and selects the HV low mode at a middle or low vehicle speed. FIG. 9 is a view illustrating a map related to mode selection in the present embodiment. In FIG. 9, a horizontal axis indicates a vehicle speed and a vertical axis indicates required driving force. As illustrated in FIG. 9, a low load region with a low vehicle speed and small required driving force is a motor traveling region. In the motor traveling region, the EV traveling is selected. In the motor traveling region, for example, the single motor EV mode is selected during a low load and the both-drive EV mode is selected during a high load.

A region with a vehicle speed or a load higher than that of the motor traveling region is an engine traveling region. The engine traveling region is further divided into a direct connection (low) region and an OD (high) region. The direct connection region is an engine traveling region in which the HV low mode is selected. The OD region is an engine traveling region in which the HV high mode is selected. The OD region is a region with a high vehicle speed and the direct connection region is a region with a middle or low vehicle speed. The direct connection region is set closer to the high load side than the OD region. By making the transmission unit 40 an overdrive during the high vehicle speed and the low load, it is possible to improve a mileage.

For example, as indicated by an arrow Y1, when transition from the motor traveling region to the direct connection region is performed, transition from the EV traveling mode to the HV low mode is performed. Also, as indicated by an arrow Y2, when transition from the motor traveling region to the OD region is performed, transition from the EV traveling mode to the HV high mode is performed.

In the present embodiment, a rotation of the engine 1 is shifted and output by the switching between the HV high mode and the HV low mode, whereby there are two mechanical points and a mileage can be improved. Note that each of the mechanical points is an operation point with high efficiency where whole power input into the planetary gear mechanisms 10 and 20 is mechanically transmitted to the counter drive gear 25 without passing through an electric path.

In the driving apparatus for a hybrid vehicle 1-1 according to the present embodiment, a rotation of the engine 1 can be increased by the first planetary gear mechanism 10 and can be output from the first ring gear 13. Thus, the driving apparatus for a hybrid vehicle 1-1 further includes another mechanical point on a high gear side with respect to a mechanical point of when the first planetary gear mechanism 10 is not included and the engine 1 is directly connected to the second carrier 24. That is, the driving apparatus for a hybrid vehicle 1-1 includes two mechanical points on the high gear side. Accordingly, the driving apparatus for a hybrid vehicle 1-1 can realize a hybrid system with which a mileage can be improved by improvement of transmission efficiency during high-speed traveling.

Also, by the engagement of the clutch CL1 and the brake BK1 of the transmission unit 40, the driving apparatus for a hybrid vehicle 1-1 can regulate a rotation of an input element of the second planetary gear mechanism 20, whereby traveling in the both motor EV mode becomes possible. Thus, it is not necessary to separately provide a clutch or the like to realize the both motor EV mode and a configuration is simplified. In a layout of the present embodiment, a reduction ratio of the second rotary machine MG2 can be large. Also, by an FF or RR layout, a compact arrangement can be realized.

(Backward Traveling)

In a case of performing backward traveling, while engine traveling is performed, the first rotary machine MG1 generates power as a generator. Also, the second rotary machine MG2 performs power running as a motor, performs a negative rotation, outputs negative torque, and performs traveling. When the battery is charged fully, the second rotary machine MG2 may be rotated singularly and inversely in the single-drive EV mode and may perform motor traveling. Also, it is possible to fix the second carrier 24 and to perform backward traveling in the both-drive EV mode.

(Cooperative Transmission Control)

When switching the HV high mode and the HV low mode, the HV_ECU 50 can execute cooperative transmission control to simultaneously shift the first planetary gear mechanism 10 and the second planetary gear mechanism 20. In the cooperative transmission control, the HV_ECU 50 increases a transmission gear ratio of one of the first planetary gear mechanism 10 and the second planetary gear mechanism 20 and decreases a transmission gear ratio of the other.

When switching from the HV high mode to the HV low mode, the HV_ECU 50 changes the transmission gear ratio of the second planetary gear mechanism 20 to the high gear side in synchronization with the switching of the mode. Accordingly, a discontinuous change in a transmission gear ratio of the whole vehicle 100 from the engine 1 to the drive wheel 32 can be controlled or decreased. Thus, a degree of change in the transmission gear ratio can be decreased. Since the change in the transmission gear ratio from the engine 1 to the drive wheel 32 is controlled, an adjustment amount of the engine speed along with the shifting can be decreased or an adjustment of the engine speed becomes unnecessary. For example, the HV_ECU 50 shifts the first planetary gear mechanism 10 and the second planetary gear mechanism 20 in a coordinated manner in such a manner that the transmission gear ratio of the whole vehicle 100 is changed continuously to a low side.

On the other hand, when switching from the HV low mode to the HV high mode is performed, the HV_ECU 50 changes the transmission gear ratio of the second planetary gear mechanism 20 to a low gear side in synchronization with the switching of the mode. Accordingly, a discontinuous change of the transmission gear ratio of the whole vehicle 100 can be controlled or decreased. Thus, a degree of change in the transmission gear ratio can be decreased. For example, the HV_ECU 50 shifts the first planetary gear mechanism 10 and the second planetary gear mechanism 20 in a coordinated manner in such a manner that the transmission gear ratio of the whole vehicle 100 is changed continuously to a high side.

An adjustment of the transmission gear ratio of the second planetary gear mechanism 20 is performed, for example, by control of the rotation speed of the first rotary machine MG1. For example, the HV_ECU 50 controls the first rotary machine MG1 in such a manner that a transmission gear ratio between the input shaft 2 and the counter drive gear 25 is changed continuously. Accordingly, the whole including the planetary gear mechanisms 10 and 20, the first rotary machine MG1, the clutch CL1, and the brake BK1, that is, a transmission apparatus including the differential unit and the transmission unit 40 operates as an electric continuously variable transmission. Since a transmission gear ratio width of the transmission apparatus including the differential unit and the transmission unit 40 is wide, a transmission gear ratio from the differential unit to the drive wheel 32 can be large. Also, a power circulation during the high vehicle speed traveling in the HV traveling mode is decreased.

Here, in the vehicle 100, there is a case where an output from the first rotary machine MG1 or the second rotary machine MG2 is limited and decreased. For example, there is a case where a temperature of the rotary machine MG1/MG2 or an inverter is increased rand an output from the rotary machine MG1/MG2 is limited. Also, when a temperature of the battery is higher or lower than a predetermined temperature range, there is a case where an input/output current of the battery is limited and output torque or a power-generation amount of the rotary machine MG1/MG2 is limited. As described in the following, in the vehicle 100 according to the present embodiment, when the output from the rotary machine MG1/MG2 is limited, driving force or the like is decreased.

In FIG. 10, a collinear diagram of when starting is performed in the HV low mode is illustrated. Since the clutch CL1 is completely engaged, the engine speed, a rotation speed nr1 of the first ring gear 13, and a rotation speed of the second carrier 24 become identical to each other. Accordingly, engine speed is limited by the MG1 rotation speed. Accordingly, for example, when the output from the first rotary machine MG1 is limited, as described with reference to FIG. 11, it may not be possible to operate the engine at an operation point where an intended output can be performed.

In FIG. 11, a horizontal axis indicates the rotation speed nr1 of the first ring gear 13 and a vertical axis indicates torque (hereinafter, also referred to as "transmission unit output torque") tr1 output from the first ring gear 13 to the second carrier 24. When the clutch CL1 is completely engaged, the engine speed matches the rotation speed nr1 of the first ring gear 13. Thus, the horizontal axis also indicates the engine speed. Here, tr1max indicates a maximum torque line of the engine 1 of when the clutch CL1 is completely engaged. The maximum torque line tr1max of the engine 1 is a curved line indicating a correspondence relationship between each engine speed and the maximum torque which can be output from the engine 1.

Torque which can be output from the first ring gear 13 to the second ring gear 23, that is, torque which can be transmitted through the second planetary gear mechanism 20 depends on reaction torque output from the first rotary machine MG1. That is, an upper limit of the transmission unit output torque tr1 is determined depending on MG1 torque tg.

Each of the outputable torque lines tr1_1 and tr1_2 indicates the maximum torque which can be output from the first ring gear 13. Each of the outputable torque lines tr1_1 and tr1_2 is determined based on an MG1 rotation speed corresponding to the rotation speed nr1 of the first ring gear 13 and an upper limit value of the MG1 torque in the MG1 rotation speed. The outputable torque line tr1_1 during non-limitation corresponds to the maximum value of the MG1 torque which can be output when an output from the first rotary machine MG1 is not limited. The outputable torque line tr1_2 during output limitation corresponds to the maximum value of the MG1 torque which can be output when an output from the first rotary machine MG1 is limited. When the output from the first rotary machine MG1 is limited, the maximum value of the MG1 torque is decreased with respect to the same MG1 rotation speed compared to a case of non-limitation. Accordingly, the outputable torque line tr1_2 during the output limitation is closer to a low torque side than the outputable torque line tr1_1 during the non-limitation.

When an output from the first rotary machine MG1 is not performed, the maximum torque which can be output from the engine 1 to the second carrier 24 is torque of an intersection point P1 between maximum torque line tr1max of the engine 1 and the outputable torque line tr1_1 during the non-limitation. That is, when the output from the first rotary machine MG1 is not limited, the maximum torque can be output from the first planetary gear mechanism 10 when the engine 1 is operated at the operation point P1.

When the output from the first rotary machine MG1 is limited, an upper limit of the MG1 torque which can be output with respect to the same MG1 rotation speed is decreased. Accordingly, when the output from the first rotary machine MG1 is limited, it is necessary to decrease the MG1 rotation speed in order to receive reaction force, which is similar to that before the output limitation, by the first rotary machine MG1. However, when the MG1 rotation speed is decreased, the rotation speed of the second carrier 24 is also decreased and the engine speed is also decreased in a similar manner. Also, the outputable torque line tr1_2 during the output limitation is placed closer to a low torque side than the outputable torque line tr1_1 during the non-limitation.

Accordingly, when the output from the first rotary machine MG1 is limited, the maximum torque which can be output from the engine 1 to the second carrier 24 is torque of an intersection point P2 between the maximum torque line tr1max of the engine 1 and the outputable torque line tr1_2 during the output limitation. That is, when the output from the first rotary machine MG1 is limited, the maximum torque can be output from the first planetary gear mechanism 10 when the engine 1 is operated at the operation point P2. Accordingly, as indicated by an arrow Y3 in FIG. 11, when the output from the first rotary machine MG1 is limited, an upper limit of the transmission unit output torque tr1 becomes smaller. In a case where required driving force of the vehicle 100 is large such as a case where an accelerator is pressed strongly, when the output from the first rotary machine MG1 is limited and the transmission unit output torque tr1 is decreased, driving force of the vehicle 100 is decreased.

As described in the following, when the output from the first rotary machine MG1 is limited, the driving apparatus for a hybrid vehicle 1-1 of the present embodiment slips the clutch CL1 and changes the operation point of the engine 1. Accordingly, it is possible to control a decrease in the transmission unit output torque tr1 and to control a decrease in the driving force.

As illustrated in FIG. 12, when the output from the first rotary machine MG1 is limited, the HV_ECU 50 makes the clutch CL1 half-engaged and slips the clutch CL1. Accordingly, a differential movement of the first planetary gear mechanism 10 is allowed. Thus, it is possible to change the operation point of the engine 1 in such a manner that the engine speed becomes high with respect to the rotation speed nr1 of the first ring gear 13. In other words, it is possible to set the first planetary gear mechanism 10 as an underdrive, to decrease the rotation speed of the engine 1, and to output the rotation from the first ring gear 13. As illustrated in FIG. 12, when the clutch CL1 is slipped, a transmission gear ratio (engine speed/rotation speed nr1 of first ring gear 13) of the first planetary gear mechanism 10 can be increased and can be brought to an underdrive side than that before the clutch CL1 is slipped (see FIG. 10).

As illustrated in FIG. 13, when the clutch CL1 is slipped, the maximum torque line of the engine 1 is changed. The maximum torque line tr1max1 of the engine 1 in a case where the clutch CL1 is slipped (hereinafter, also simply referred to as "maximum torque line of engine 1 during slip") is on a high torque side compared to the maximum torque line tr1max of the engine 1 in a case where the clutch CL1 is completely engaged.

When the clutch CL1 is slipped, the maximum torque which can be output from the engine 1 to the second carrier 24 is torque at an intersection point P3 between the maximum torque line tr1max1 of the engine 1 during the slip and the outputable torque line tr1_2 of when the output is limited. That is, as indicated by an arrow Y4, by slipping the clutch CL1, the engine 1 can be operated at the operation point P3 with torque higher than that at the operation point P2 of the maximum torque in a case where the clutch CL1 is completely engaged. Accordingly, it is possible to control a decrease in the transmission unit output torque tr1 due to the limitation of the output from the first rotary machine MG1.

In a case where the MG1 rotation speed can be acquired independently, even when the output from the first rotary machine MG1 is limited, there is a margin of torque in the first rotary machine MG1. When it is possible to decrease the MG1 rotation speed and to increase the MG1 torque, it becomes possible to output, from the first ring gear 13, torque larger than the torque at the intersection point P2. However, in a case where the clutch CL1 is completely engaged, when the MG1 rotation speed is decreased, the engine speed is decreased in conjunction therewith. Accordingly, the engine torque is restricted and it is not possible to increase the transmission unit output torque tr1. On the other hand, according to the driving apparatus for a hybrid vehicle 1-1 of the present embodiment, by slipping the clutch CL1, it is possible to increase the MG1 torque by decreasing the MG1 rotation speed and to increase the engine torque by increasing the engine speed, simultaneously.

In the present description, the control to change an operation point of the engine 1 by slipping the engagement apparatus in a case where the output from the rotary machine MG1/MG2 is limited is also simply referred to as "operation point changing control". Note that the operation point changing control can be executed in at least one of a case where the output from the first rotary machine MG1 is limited and a case where the output from the second rotary machine MG2 is limited. Also, as described later, the "case where the output from the rotary machine MG1/MG2 is limited" includes a case where the output from the rotary machine MG1/MG2 is limited and a case where it is predicted that the output from the rotary machine MG1/MG2 is to be limited.

An operation of the driving apparatus for a hybrid vehicle 1-1 of the present embodiment will be described with reference to FIG. 1 and FIG. 14. A control flow illustrated in FIG. 1 is repeatedly executed, for example, at predetermined intervals. In FIG. 14, a time chart of when an operation point changing control is executed after the output from the first rotary machine MG1 is actually limited is illustrated. In FIG. 14, (a) indicates an engine speed, (b) indicates MG1 torque, (c) indicates an MG1 rotation speed, (d) indicates engine torque, (e) indicates driving force of the vehicle 100, (f) indicates a supply hydraulic pressure to the clutch CL1, (g) indicates a differential rotation speed of the clutch CL1 (rotation speed Ns1 of first sun gear 11—rotation speed Nc1 of first carrier 14), and (h) indicates power of the first rotary machine MG1 (MG1 torque×MG1 rotation speed).

In step S10, the HV_ECU 50 determines whether the output from the rotary machine MG1/MG2 is limited. For example, the HV_ECU 50 compares the output from the rotary machine MG1/MG2 (target value or command value of torque, current value, rotation speed, power, and the like), which output is determined from the required driving force of the vehicle 100, with the actual output from the rotary machine MG1/MG2 and performs the determination in step S10. When the actual output from the rotary machine MG1/MG2 is smaller than the output from the rotary machine MG1/MG2 which output is determined from the required driving force, the HV_ECU 50 makes affirmative determination in step S10. Also, the HV_ECU 50 makes affirmative determination in step S10 when the output from at least one of the first rotary machine MG1 and the second rotary machine MG2 is limited.

As a result of the determination in step S10, in a case where it is determined that the output from the rotary machine MG1/MG2 is limited (step S10—Y), the processing goes to step S40 and in the other case (step S10—N), the processing goes to step S20. In FIG. 14, limitation of the output from the first rotary machine MG1 is started at time t1. The HV_ECU 50 changes an operation point of the first rotary machine MG1 in such a manner that engine torque becomes as high as possible with respect to the limitation of the output from the first rotary machine MG1. Here, the MG1 rotation speed is decreased. By the limitation of the output, the MG1 torque is also decreased (absolute value is decreased). After the time t1, the affirmative determination is made in step S10 and the processing goes to step S40.

In step S20, the HV_ECU 50 determines whether limitation of the output from the rotary machine MG1/MG2 is predicted. The HV_ECU 50 determines whether it is likely that the output from the rotary machine MG1/MG2 is limited in the near future although the output from the rotary machine MG1/MG2 is not actually limited. For example, based on a result of detection of a temperature of the rotary machine MG1/MG2 or the inverter, a temperature of the battery, a charged state SOC of the battery, or the like, the HV_ECU 50 predicts whether the output from the rotary machine MG1/MG2 is to be limited. For example, when it is predicted that the temperature of the rotary machine MG1/MG2, the inverter, or the battery becomes out of a target range or when it is predicted that the charged state SOC of the battery becomes a value which is not in a target range, affirmative determination is made in step S20.

As a result of the determination in step S20, in a case where it is determined that limitation of the output from the rotary machine MG1/MG2 is predicted (step S20—Y), the processing goes to step S40 and in the other case (step S20—N), the processing goes to step S30.

In step S40, the HV_ECU 50 calculates a necessary differential rotation speed. The necessary differential rotation speed is a necessary amount of a differential rotation speed between an engagement element on a side of the first sun gear 11 of the clutch CL1 and an engagement element on a side of the first carrier 14 thereof. The necessary differential rotation speed is a differential rotation speed necessary for bringing an engine operation point to a target engine operation point. The necessary differential rotation speed is at least what can control a decrease in the transmission unit output torque tr1 compared to a case where the clutch CL1 is completely engaged. Preferably, the necessary differential rotation speed is what can compensate a decrease in the transmission unit output torque tr1 due to a decrease in the output from the first rotary machine MG1 and can bring the decrease in the transmission unit output torque tr1 into zero.

Figure 16:
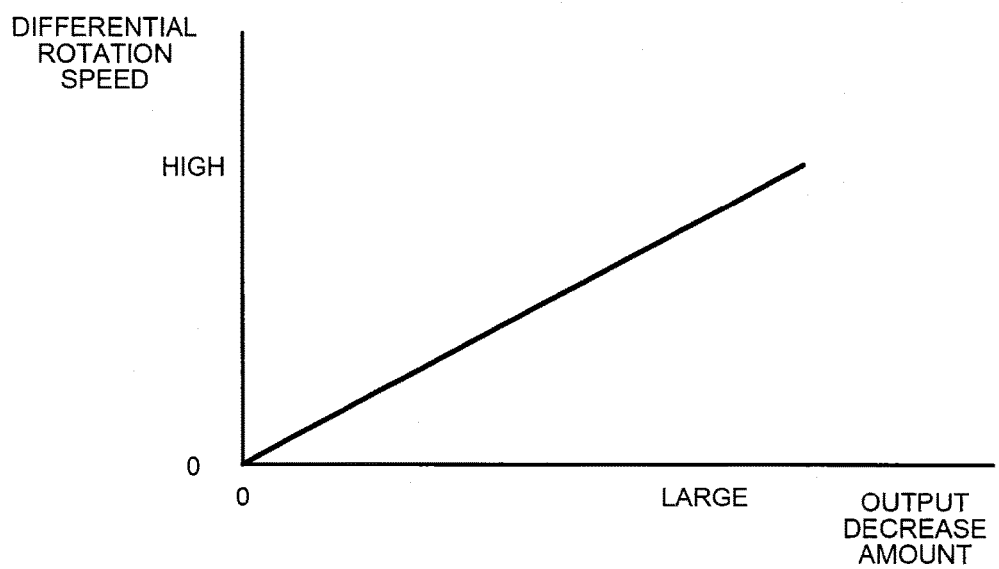
FIG. 16 is a view illustrating an example of a correspondence relationship between an output decrease amount in the rotary machine and a necessary differential rotation speed.

A necessary differential rotation speed of when a decrease in the output from the rotary machine MG1/MG2 is large is a value larger than a necessary differential rotation speed of when a decrease in the output from the rotary machine MG1/MG2 is small. FIG. 16 is a view illustrating an example of a correspondence relationship between an output decrease amount of the rotary machine MG1/MG2 and a necessary differential rotation speed. A horizontal axis in FIG. 16 is an output decrease amount of the rotary machine MG1/MG2. Here, for example, the output decrease amount is a difference between the output from the rotary machine MG1/MG2, which output is determined from the required driving force of vehicle 100, and the actual output from the rotary machine MG1/MG2.

For example, in a case of the first rotary machine MG1, the output decrease amount is a difference between the output from the first rotary machine MG1 (MG1 torque, MG1 rotation speed, MG1 current, and MG1 power) which output is determined from the required driving force of the vehicle 100 and the actual output from the first rotary machine MG1 (MG1 torque, MG1 rotation speed, MG1 current, and MG1 power). Note that when the output is limited in both of the first rotary machine MG1 and in the second rotary machine MG2, the necessary differential rotation speed may be calculated with a sum of the output decrease amount of the two as an output decrease amount in a horizontal axis. As illustrated in FIG. 16, in the present embodiment, it is set that the necessary differential rotation speed is increased linearly with respect to an increase in the output decrease amount. Accordingly, the larger the decrease in the output from the rotary machine MG1/MG2 is, the more the HV_ECU 50 increases the differential rotation speed of the engagement apparatus. Also, when the output decrease amount is zero, the necessary differential rotation speed becomes zero and the clutch CL1 is completely engaged.

Based on the output decrease amount of the rotary machine MG1/MG2, the HV_ECU 50 calculates the necessary differential rotation speed. In FIG. 14, based on the output decrease amount of the first rotary machine MG1 between the time t1 and t2, the necessary differential rotation speed is calculated in step S40. When the necessary differential rotation speed is calculated, the processing goes to step S50.

In step S50, the HV_ECU 50 calculates a limit of a differential rotation speed. In order to secure durability of the clutch CL1, the HV_ECU 50 limits the necessary differential rotation speed according to an accumulation value of heat generation in the clutch CL1. When the differential rotation speed of the clutch CL1 is increased, more heat is generated in the clutch CL1. When slipping of the clutch CL1 is continued until a limit of a heat quantity is reached, it is necessary to release or completely engage the clutch CL1. When the clutch CL1 is released from the slipped state, driving force changes suddenly. The sudden change is not preferable. In the present embodiment, a differential rotation speed is decreased according to an increase in an accumulated calorific value of the clutch CL1.

Figure 17:
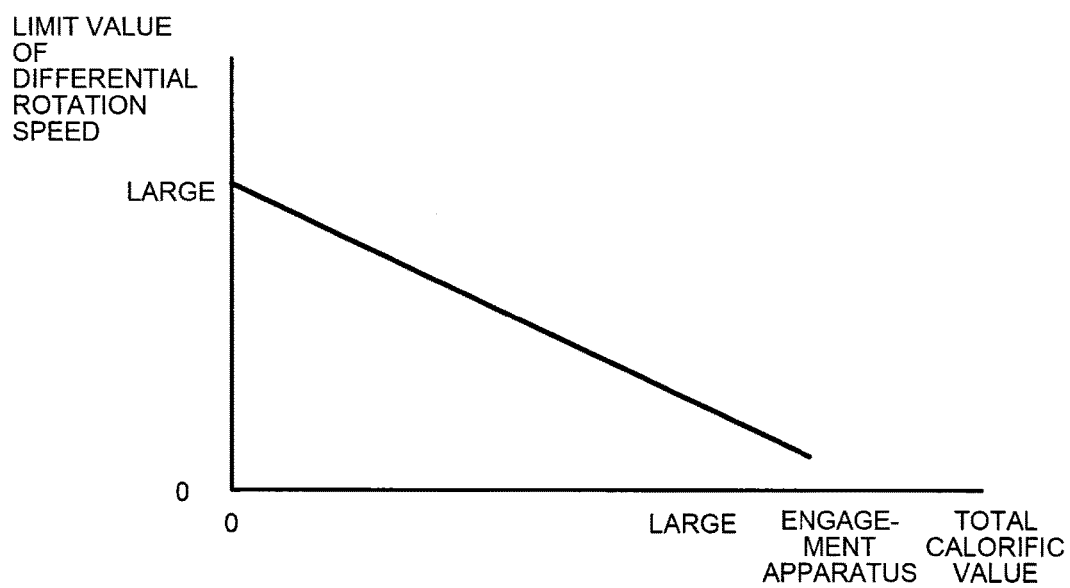
FIG. 17 is a view illustrating an example of a correspondence relationship between a calorific value in an engagement apparatus and a limit value of a differential rotation speed.

FIG. 17 is a view illustrating an example of a correspondence relationship between a calorific value of the engagement apparatus and a limit value of the differential rotation speed. A horizontal axis in FIG. 17 is a total calorific value of the engagement apparatus and is, for example, an accumulated calorific value of the engagement apparatus after the operation point changing control is started. As the differential rotation speed becomes high, heat generation per a unit time of the engagement apparatus becomes large. Thus, as duration of the slip becomes longer, a temperature of the engagement apparatus is increased. A temperature of the engagement apparatus is substantially proportional to a total calorific value. Thus, the differential rotation speed is limited with reference to the total calorific value. A vertical axis in FIG. 17 is a limit value of the differential rotation speed and is, for example, an upper limit value of the necessary differential rotation speed. As illustrated in FIG. 17, a limit value of a differential rotation speed of when a total calorific value of the engagement apparatus is large is smaller than a limit value of a differential rotation speed of when the total calorific value is small. In other words, when the total calorific value becomes large, the differential rotation speed is limited to a small value. The limit value of the differential rotation speed is linearly decreased with respect to an increase in the total calorific value. When the total calorific value becomes a predetermined upper limit calorific value allowed in the engagement apparatus, the differential rotation speed becomes zero.

Note that instead of setting a limit value of the differential rotation speed as illustrated in FIG. 17, the limit value of the differential rotation speed may be made constant while the total calorific value becomes a predetermined calorific value from zero, and the limit value of the differential rotation speed may be made smaller according to an increase in the total calorific value when the total calorific value is further increased from the predetermined calorific value.

For example, the HV_ECU 50 can previously store a relationship between a differential rotation speed and a calorific value (such as calorific value per unit time) of the engagement apparatus and can estimate a total calorific value of the engagement apparatus. Based on the calculated total calorific value, the HV_ECU 50 determines a limit value of the differential rotation speed. Note that a temperature of the engagement apparatus may be predicted or estimated from an AT oil temperature, a total calorific value, and cooling performance and may be used for the horizontal axis in FIG. 17.

The limit value of the differential rotation speed which value is calculated in step S50 is smaller than the necessary differential rotation speed calculated in step S40, the HV_ECU 50 sets the limit value of the differential rotation speed, which value is calculated in step S50, as a target value of the differential rotation speed of the clutch CL1. On the other hand, when the necessary differential rotation speed calculated in step S40 is lower than the limit value of the differential rotation speed which value is calculated in step S50, the HV_ECU 50 sets the necessary differential rotation speed as a target value of the differential rotation speed of the clutch CL1. When step S50 is executed, the processing goes to step S60.

In step S60, the HV_ECU 50 performs differential rotation speed control. The HV_ECU 50 controls the differential rotation speed of the clutch CL1 to the target value of the differential rotation speed which value is determined in step S50. In FIG. 14, the control of the differential rotation speed of the clutch CL1 is started at the time t2.

The HV_ECU 50 decreases a supply hydraulic pressure to the clutch CL1 (hereinafter, also simply referred to as "CL1 hydraulic pressure"). At the time t2, the HV_ECU 50 greatly and discontinuously decreases the CL1 hydraulic pressure in a range in which the clutch CL1 is not slipped. Then, the HV_ECU 50 gradually decreases the CL1 hydraulic pressure until time t3. At the time t3, the CL1 hydraulic pressure is decreased adequately and generation of the differential rotation speed is started. When the generation of the differential rotation speed of the clutch CL1 is started, the HV_ECU 50 changes the engine speed and the engine torque toward an engine speed and engine torque at an intended operation point (such as operation point P3 in FIG. 13). Here, the HV_ECU 50 increases the engine speed and the engine torque.

The HV_ECU 50 increases an absolute value of the MG1 torque along with an increase of the engine torque. However, when the operation is kept performed, the MG1 output exceeds the limit, and thus, the MG1 rotation speed is decreased. The driving force indicates a change in time series in a case where the series of operation is performed. When a decrease in the output from the first rotary machine MG1 happens suddenly, there is a lag between the decrease in the output and the generation of the differential rotation speed. Thus, the driving force is decreased once. Then, the driving force is increased from the time t3. The driving force is recovered to the value before the decrease in the output from the first rotary machine MG1 at time t4. After the time t4, slip stationary control to keep the differential rotation speed of the clutch CL1 constant by keeping the CL1 hydraulic pressure constant is started.

For example, when the slip stationary control is started in step S60, the HV_ECU 50 ends the present control flow.

When negative determination is made in step S20 and the processing goes to step S30, the HV_ECU 50 performs normal control in step S30. The HV_ECU 50 completely engages the clutch CL1, starts the vehicle 100, and makes the vehicle 100 travel. Note that when the limitation of the output from the first rotary machine MG1/MG2 is released from a state where the operation point changing control is performed and the processing goes to step S30, the HV_ECU 50 ends the operation point changing control. For example, when the limitation of the output from the first rotary machine MG1 is released, the HV_ECU 50 increases the output from the first rotary machine MG1, completely engages the clutch CL1, and changes the operation point of the engine 1 to an operation point of when the clutch CL1 is completely engaged. When the step S30 is executed, the present control flow is ended.

When predicting the limitation of the output from the rotary machine MG1/MG2, the driving apparatus for a hybrid vehicle 1-1 according to the present embodiment provides a preparation period to generate the differential rotation speed of the clutch CL1. When control to increase the differential rotation speed of the clutch CL1 is started after the decrease in the output from the rotary machine MG1/MG2 is actually caused, a delay may be generated in driving force compensation. When the decrease in the output from the rotary machine MG1/MG2 is predicted, the HV_ECU 50 previously decreases the CL1 hydraulic pressure before the decrease in the output is caused and decreases the torque capacity of the clutch CL1. Accordingly, it becomes possible to previously control the decrease in the transmission unit output torque tr1 due to the decrease in the output from the rotary machine MG1/MG2.

In FIG. 15, a time chart of a case where the decrease in the output from the first rotary machine MG1 is predicted and the operation point changing control is executed is illustrated. At time t11, the HV_ECU 50 predicts that the output from the first rotary machine MG1 is to be limited. The HV_ECU 50 can predict the limitation of the output, for example, based on a signal indicating a temperature of the first rotary machine MG1, a temperature of an inverter arranged between the first rotary machine MG1 and the battery, a temperature of the battery, a charged state SOC of the battery, or the like. When the decrease in the output from the first rotary machine MG1 is predicted (step S20—Y), the processing goes to step S40.

In step S40, a necessary differential rotation speed may be calculated based on a prediction value of the output decrease amount of the rotary machine MG1/MG2 instead of the actual output decrease amount of the rotary machine MG1/MG2. When step S40 is executed, step S50 is executed and the processing goes to step S60.

In step S60, the HV_ECU 50 performs differential rotation speed control. The HV_ECU 50 decreases the CL1 hydraulic pressure and prepares for generation of the differential rotation speed. In FIG. 15, slip transient control is started at time t12. In the slip transient control, first, the CL1 hydraulic pressure is greatly and discontinuously decreased in a range in which the clutch CL1 is not slipped. Then, the CL1 hydraulic pressure is gradually decreased.

When a slip of the clutch CL1 is caused, the differential rotation speed is controlled in such a manner that the operation point of the engine 1 is not changed. When limitation of the output from the first rotary machine MG1 is started at time t13, the engine 1, the first rotary machine MG1, and the clutch CL1 are controlled in such a manner that the transmission unit output torque tr1 is not decreased or in such a manner that a decrease in the driving force is controlled. The differential rotation speed of the clutch CL1 is controlled and the engine torque and the engine speed are increased in such a manner that the operation point of the engine 1 is changed to a target operation point. The MG1 torque is increased (absolute value is increased) in order to receive reaction force to the engine torque. The MG1 rotation speed is decreased in such a manner that necessary MG1 torque can be output and the MG1 power is decreased.

When the operation point of the engine becomes an intended operation point at time t14, slip stationary control to keep the differential rotation speed of the clutch CL1 constant is started.

Figure 18:
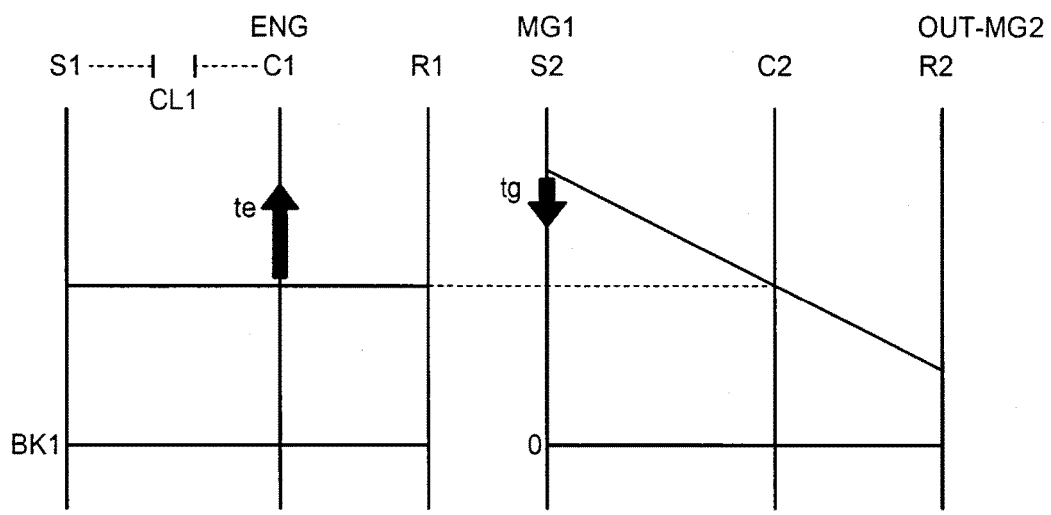
FIG. 18 is a collinear diagram during traveling with an engine as a power source.
Figure 19:
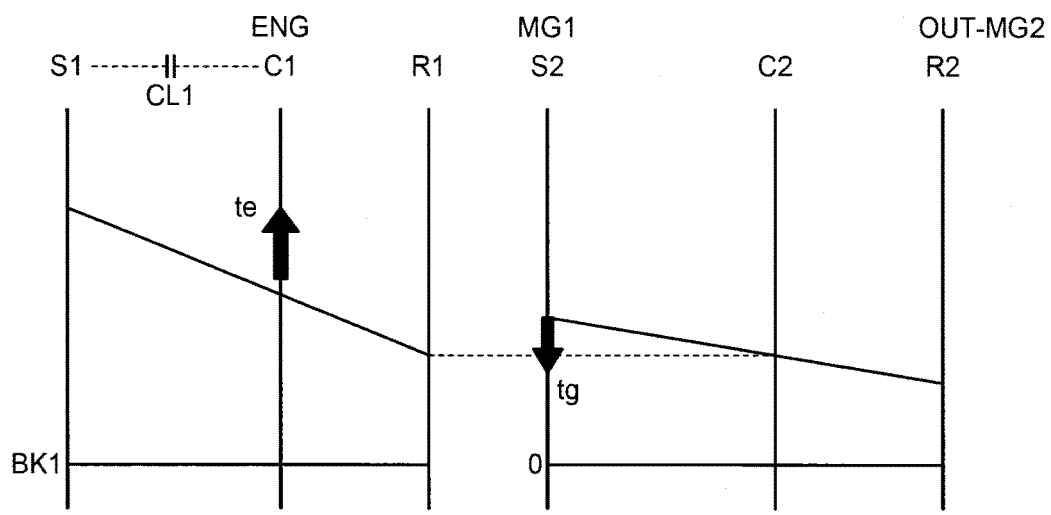
FIG. 19 is a collinear diagram of operation point changing control during traveling.

Note that the operation point changing control may be performed not only during starting but also during traveling. FIG. 18 is a collinear diagram of when traveling is performed with the engine 1 as a power source. As described with reference to FIG. 11, when the output from the rotary machine MG1/MG2 is limited during the traveling, there is a problem that the engine torque to is decreased and the driving force is decreased. On the other hand, by executing the operation point changing control during the traveling, it is possible to control the decrease in the driving force. FIG. 19 is a collinear diagram of the operation point changing control during the traveling.

As illustrated in FIG. 19, by slipping the clutch CL1, the engine speed becomes high with respect to the rotation speed nr1 of the first ring gear 13. Accordingly, with respect to the decrease in the MG1 rotation speed due to the limitation of the output from the first rotary machine MG1, it is possible to control the decrease in the engine torque and to control the decrease in the driving force.

Figure 20:
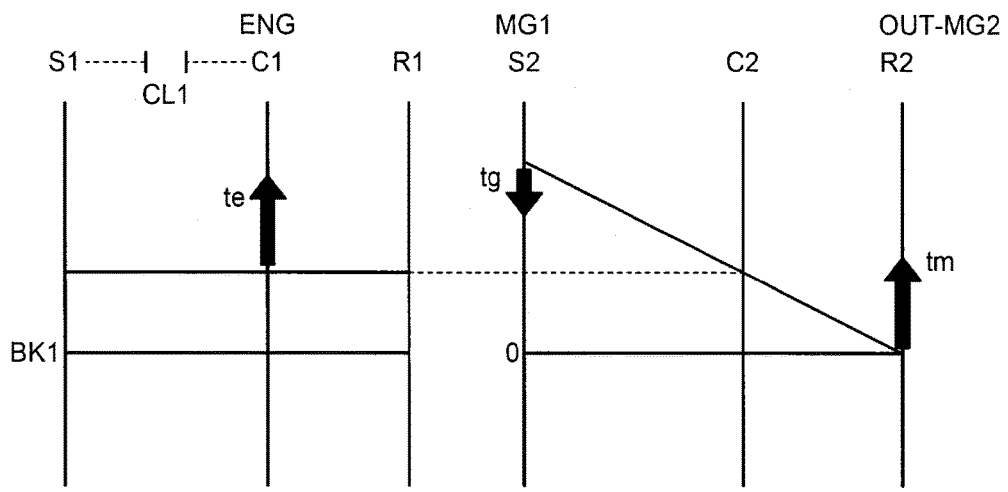
FIG. 20 is a collinear diagram of when an output from a second rotary machine is not limited.
Figure 21:
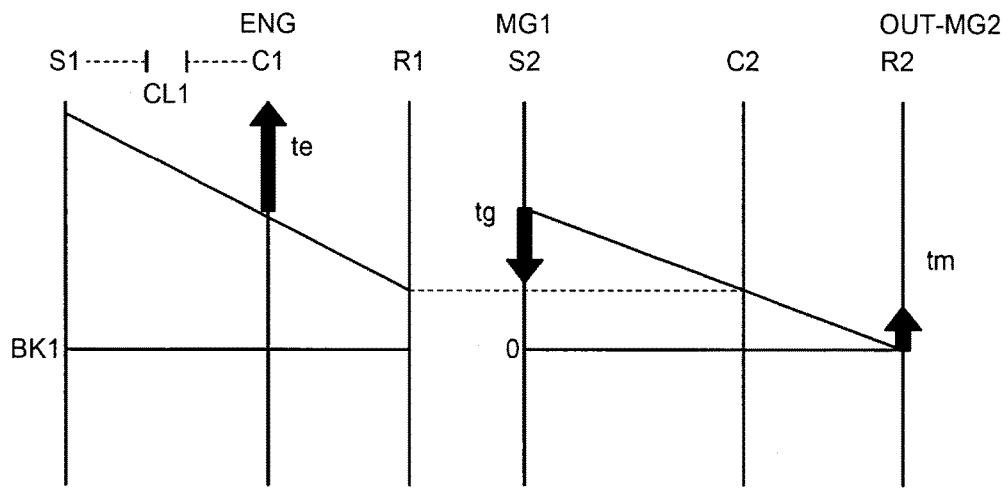
FIG. 21 is a collinear diagram of operation point changing control of when an output from the second rotary machine is limited.

In the above, description has been made with the limitation of the output from the first rotary machine MG1 as an example. However, the operation point changing control may be performed according to limitation of an output from the second rotary machine MG2. The second rotary machine MG2 is a rotary machine indirectly coupled to the second planetary gear mechanism 20 which functions as a differential unit. FIG. 20 is a collinear diagram during starting in a case where the output from the second rotary machine MG2 is not limited. FIG. 21 is a collinear diagram of operation point changing control in a case where the output from the second rotary machine MG2 is limited. As illustrated in FIG. 20, the clutch CL1 is completely engaged and the operation point of the engine 1 is controlled by the first rotary machine MG1. The second rotary machine MG2 coupled to the second ring gear 23, which is an output shaft of the second planetary gear mechanism 20, generates the driving force.

There is a case where the output from the second rotary machine MG2 is limited by a temperature increase or a single-phase lock in the second rotary machine MG2. Note that the single-phase lock indicates a state in which current keeps flowing only in one phase during a low rotation of the second rotary machine MG2. In order to control an overcurrent due to the single-phase lock, the HV_ECU 50 executes control to decrease an MG2 current and to protect an element of the inverter. For example, when an absolute value of the MG2 rotation speed is a low rotation equal to or lower than a predetermined rotation speed (such as around 100 rpm), the HV_ECU 50 limits a supply current to the second rotary machine MG2 and executes current limiting control to decrease the MG2 current.

When the output from the second rotary machine MG2 is limited by the current limiting control or the like, the driving force is decreased when the clutch CL1 is completely engaged. On the other hand, as illustrated in FIG. 21, the driving apparatus for a hybrid vehicle 1-1 according to the present embodiment slips the clutch CL1, increases the engine speed, and increases the torque. In order to correspond to the increase in the torque of the engine 1, the HV_ECU 50 decreases the MG1 rotation speed and increases the MG1 torque (reaction torque). By increasing the engine torque with respect to a decrease in MG2 torque, the decrease in the driving force can be compensated.

Also, when the operation point changing control is executed by the limitation of the output from the first rotary machine MG1, the output from the second rotary machine MG2 may be further limited. In this case, with respect to the differential rotation speed of the clutch CL1 corresponding to the output decrease amount of the first rotary machine MG1, the differential rotation speed is increased according to the output decrease amount of the second rotary machine MG2. Accordingly, it is possible to increase the engine torque, to make input torque into the second planetary gear mechanism 20 high, and to compensate the decrease in the MG2 torque.

Note that in the present embodiment, the clutch CL1 and the brake BK1 are the engagement apparatuses to shift the first planetary gear mechanism 10 but the number of engagement apparatuses and a kind thereof are not limited thereto. Also, the clutch CL1 is not limited to what couples the first sun gear 11 and the first carrier 14 and may be what couples different rotary elements of the first planetary gear mechanism 10. The brake BK1 is not limited to what regulates a rotation of the first sun gear 11 and may be what regulates a rotation of a different rotary element of the first planetary gear mechanism 10.

In the present embodiment, a case where an engine is the engine 1 has been described as an example. However, a different engine may be mounted on the vehicle 100 instead of the engine 1.

Also, the transmission unit 40 of the present embodiment is what can increase the rotation speed of the engine 1 and can output the rotation from the output element. Alternatively, the transmission unit 40 may be what can decrease the rotation speed of the engine 1 and can output the rotation. For example, by connecting the engine 1 to the first ring gear 13 and by connecting the second carrier 24 to the first carrier 14, the transmission unit 40 can be an underdrive type. In an underdrive type transmission unit 40, by slipping the engagement apparatus, it is possible to bring a transmission gear ratio of the transmission unit 40 to an underdrive side compared to that before the slip.

The vehicle 100 of the present embodiment includes two rotary machines which are the first rotary machine MG1 and the second rotary machine MG2. However, the vehicle 100 may be what does not include the second rotary machine MG2. In a vehicle 100 not including the second rotary machine MG2, when the output from the first rotary machine MG1 is limited, an engagement apparatus is slipped and an operation point of the engine 1 is changed.

In a case where shifting is performed in the differential unit, a part of engine power is absorbed by the first rotary machine MG1. In the vehicle 100 not including the second rotary machine MG2, it is not possible to balance power by making the second rotary machine MG2 output the power absorbed by the first rotary machine MG1. Thus, in the vehicle not including the second rotary machine MG2, a transmission function to shift a rotation of the engine 1 is provided.

To the vehicle 100 not including the second rotary machine MG2, for example, a multispeed AT (such as four speeds or more) may be mounted as the transmission unit 40. Alternatively, a transmission (such as AT or belt-type CVT) may be added between the output shaft and the drive shaft 31 of the differential unit.

First Modification of Embodiment

Figure 22:
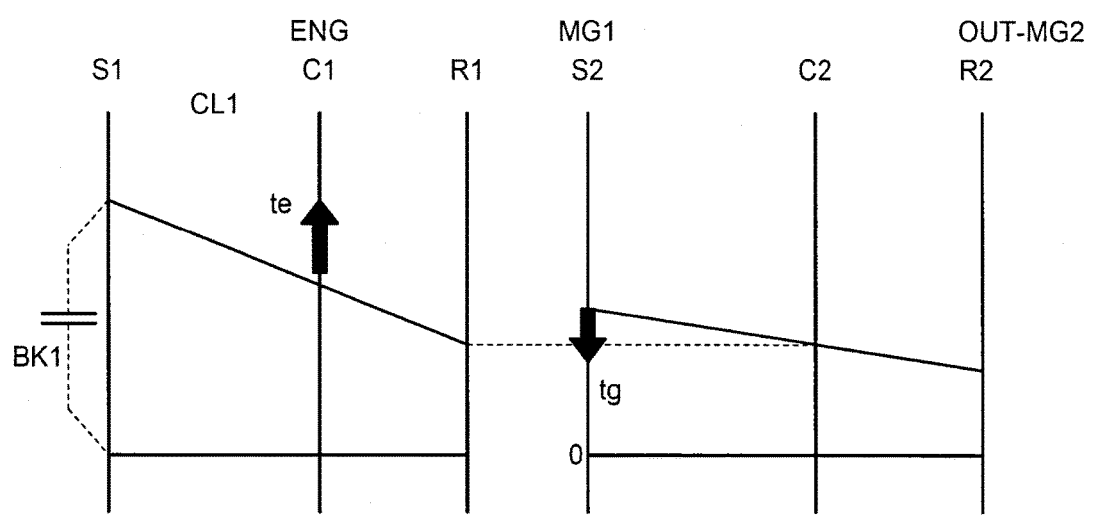
FIG. 22 is a collinear diagram of operation point changing control according to a first modification of the embodiment.

A first modification of the embodiment will be described. In the above embodiment, the clutch CL1 is slipped in the operation point changing control but the brake BK1 may be slipped instead. FIG. 22 is a collinear diagram of operation point changing control according to the first modification of the embodiment.

The operation point changing control to slip a brake BK1 is executed, for example, when an output from a rotary machine MG1/MG2 is limited in an HV high mode. When the output from the rotary machine MG1/MG2 is limited, the HV_ECU 50 decreases a supply hydraulic pressure to a completely-engaged brake BK1 and slips the brake BK1. Accordingly, at least a transmission gear ratio of a transmission unit 40 can be brought to an underdrive side compared to that before the brake BK1 is slipped. Moreover, as illustrated in FIG. 22, an engine speed can become high with respect to a rotation speed nr1 of the first ring gear 13. Thus, it is possible to increase torque of an engine 1 and to control a decrease in driving force.

Second Modification of Embodiment

In a case of returning from limitation of an output from a second rotary machine MG2 while operation point changing control is performed by the limitation of the output from the second rotary machine MG2, a rise of MG2 torque may be gently performed. In a case of returning from the limitation of the output from the second rotary machine MG2 such as a case where determination of a single-phase lock is released, the MG2 torque is likely to be increased suddenly. On the other hand, responsiveness of a hydraulic pressure of a clutch CL1 or a brake BK1 is lower than responsiveness of the MG2 torque. Thus, complete-engagement of the clutch CL1 or the brake BK1 may be delayed with respect to the rise of the MG2 torque and drivability may be decreased. Also, it takes time to change an operation point of the engine 1. Thus, a decrease in engine torque may be delayed with respect to an increase in the MG2 torque and drivability may be decreased.

Note that even when an upper limit of the output from the second rotary machine MG2 is lowered, in a case where required driving force is small and a target value of the MG2 torque is torque in a limited range, limitation of the output is not caused. Thus, the operation point changing control is not executed. In this case, the clutch CL1 or the brake BK1 is kept engaged. Thus, unlike a case where the operation point changing control is performed, it is possible to increase the MG2 torque immediately.

Thus, a rise of the torque of the second rotary machine MG2 in a case of returning from current limiting control may be varied depending on whether the clutch CL1 or the brake BK1 is slipped. A rise of the MG2 torque in a case where an engagement apparatus is slipped by a decrease in the output from the second rotary machine MG2 by the current limiting control is preferably gentler than a rise of the MG2 torque in a case where the engagement apparatus is not slipped.

That is, a degree (degree of change rate, change acceleration rate, or the like) of variation of the torque of the second rotary machine in a case of returning from the current limiting control preferably varies depending on whether the engagement apparatus is slipped. A degree of variation in the MG2 torque of when the engagement apparatus is slipped is preferably smaller than a degree of variation of the MG2 torque of when the engagement apparatus is completely engaged.

In the above embodiment and modifications, the following power transmission apparatus is disclosed.

A power transmission apparatus including: an engine, an engagement unit, a transmission unit, a differential unit, and a rotary machine, wherein an output shaft of the engine is coupled to the differential unit through the engagement unit and the transmission unit, the rotary machine is directly or indirectly connected to the differential unit in such a manner that an output shaft rotation speed of the transmission unit can be controlled, and when power of the engine is transmitted, an engagement apparatus is half-engaged in a case where an output from the rotary machine is limited.

Contents disclosed in the above embodiment and modifications can be arbitrarily combined and executed.

REFERENCE SIGNS LIST 1-1 driving apparatus for hybrid vehicle
1 engine
10 first planetary gear mechanism
20 second planetary gear mechanism
21 second sun gear
23 second ring gear
24 second carrier
32 drive wheel
40 transmission unit
100 vehicle
MG1 first rotary machine
MG2 second rotary machine
P1, P2, P3 operation point
tr1 transmission unit output torque
tr1max maximum torque line of engine
tr1_1 outputable torque line during non-limitation
tr1_2 outputable torque line during output limitation

The invention claimed is:
1. A driving apparatus for a hybrid vehicle comprising:
an engine;
a transmission which is connected to the engine and is shifted by an engagement apparatus;
a differential which connects the transmission and a drive wheel, the differential including
a first rotary element connected to an output element of the transmission;
a second rotary element connected to a first rotary machine; and
a third rotary element connected to the drive wheel; and
a controller configured to slip the engagement apparatus and change an operation point of the engine at a time an output from the first rotary machine is decreasing.
2. The driving apparatus for the hybrid vehicle according to claim 1, wherein the change of the operation point brings a transmission gear ratio of the transmission to an underdrive side compared to the transmission gear ratio before the engagement apparatus is slipped.
3. The driving apparatus for the hybrid vehicle according to claim 1, further comprising a second rotary machine connected to the drive wheel and the third rotary element, wherein
the controller is configured to slip the engagement apparatus and change an operation point of the engine in at least one of a case where an output from the first rotary machine is limited, and a case where an output from the second rotary machine is limited.
4. The driving apparatus for the hybrid vehicle according to claim 1, wherein the larger a decrease in the output from the rotary machine becomes, the more a differential rotation speed of the engagement apparatus is increased.

5. The driving apparatus for the hybrid vehicle according to claim 1, wherein a torque capacity of the engagement apparatus is previously decreased before the output from the rotary machine is decreased.

6. The driving apparatus for the hybrid vehicle according to claim 3, wherein
the controller is configured to perform current limiting control to limit a supply current to the second rotary machine during a low rotation of the second rotary,
a degree of variation in torque of the second rotary machine in a case of returning from the current limiting control varies depending on whether the engagement apparatus is slipped, and
a degree of variation in the torque of the second rotary machine of when the engagement apparatus is slipped is smaller than a degree of variation in the torque of the second rotary machine of when the engagement apparatus is completely engaged.

7. The driving apparatus for the hybrid vehicle according to claim 2, wherein the larger a decrease in the output from the rotary machine becomes, the more a differential rotation speed of the engagement apparatus is increased.

8. The driving apparatus for the hybrid vehicle according to claim 3, wherein the larger a decrease in the output from the rotary machine becomes, the more a differential rotation speed of the engagement apparatus is increased.

9. The driving apparatus for the hybrid vehicle according to claim 2, wherein a torque capacity of the engagement apparatus is previously decreased before the output from the rotary machine is decreased.

10. The driving apparatus for the hybrid vehicle according to claim 3, wherein a torque capacity of the engagement apparatus is previously decreased before the output from the rotary machine is decreased.

11. The driving apparatus for the hybrid vehicle according to claim 1, wherein the transmission includes a first planetary gear mechanism, and the differential includes a second planetary gear mechanism.

12. The driving apparatus for the hybrid vehicle according to claim 11, wherein in the second planetary gear mechanism, the first rotary element includes a carrier, the second rotary element includes a sun gear, and the third rotary element includes a ring gear.

13. The driving apparatus for the hybrid vehicle according to claim 2, wherein the transmission includes a first planetary gear mechanism, and the differential includes a second planetary gear mechanism.

14. The driving apparatus for the hybrid vehicle according to claim 13, wherein in the second planetary gear mechanism, the first rotary element includes a carrier, the second rotary element includes a sun gear, and the third rotary element includes a ring gear.

* * * * *